(12) United States Patent
Oikawa et al.

(10) Patent No.: US 7,868,112 B2
(45) Date of Patent: Jan. 11, 2011

(54) FLUORINE-CONTAINING POLYMER AND RESIN COMPOSITION

(75) Inventors: Hisao Oikawa, Ichihara (JP); Koji Ohguma, Ichihara (JP); Kenya Ito, Ichihara (JP); Minoru Nakayama, Ichihara (JP); Shin Koga, Ichihara (JP); Mikio Yamahiro, Ichihara (JP); Hiroyuki Sato, Ichihara (JP)

(73) Assignee: Chisso Corporation, Osaka-shi, Osaka (JP)

( * ) Notice: Subject to any disclaimer, the term of this patent is extended or adjusted under 35 U.S.C. 154(b) by 65 days.

(21) Appl. No.: 12/519,347

(22) PCT Filed: Dec. 17, 2007

(86) PCT No.: PCT/JP2007/074238

§ 371 (c)(1),
(2), (4) Date: Jun. 15, 2009

(87) PCT Pub. No.: WO2008/072766

PCT Pub. Date: Jun. 19, 2008

(65) Prior Publication Data

US 2010/0063222 A1    Mar. 11, 2010

(30) Foreign Application Priority Data

Dec. 15, 2006    (JP)  .............................. 2006-339011

(51) Int. Cl.
*C08F 30/08*    (2006.01)
(52) U.S. Cl. ................. 526/279; 525/326.5; 525/328.8; 525/329.5; 525/330.3; 528/32; 528/42
(58) Field of Classification Search ........................ None
See application file for complete search history.

(56) References Cited

U.S. PATENT DOCUMENTS

| 7,687,593 B2 * | 3/2010 | Yamahiro et al. ............. 528/31 |
| 2006/0003256 A1 | 1/2006 | Takahashi et al. |

FOREIGN PATENT DOCUMENTS

| JP | 61-275365 | 12/1986 |
| JP | 05-086193 | 4/1993 |
| JP | 2007-119728 | 5/2007 |
| JP | 2007-216615 | 8/2007 |
| JP | 2007-308527 | 11/2007 |
| WO | WO 2004/079454 | 9/2004 |

OTHER PUBLICATIONS

International Search Report dated Jan. 7, 2008.

* cited by examiner

*Primary Examiner*—Marc S Zimmer
(74) *Attorney, Agent, or Firm*—Knobbe, Martens, Olson & Bear, LLP

(57) ABSTRACT

A polymer containing: a constitutional unit A that is derived from fluorosilsesquioxane having one addition polymerizable functional group in a molecule; a constitutional unit B that is derived from organopolysiloxane having an addition polymerizable functional group; and a constitutional unit C that is derived from an addition polymerizable monomer and has a group having a polymerizable unsaturated bond on a side chain, and optionally containing a constitutional unit D that is derived from an addition polymerizable monomer other than the fluorosilsesquioxane having one addition polymerizable functional group in a molecule, the organopolysiloxane having an addition polymerizable functional group and the addition polymerizable monomer having a functional group capable of introducing a group having a polymerizable unsaturated bond.

19 Claims, No Drawings

FLUORINE-CONTAINING POLYMER AND RESIN COMPOSITION

CROSS-REFERENCE TO RELATED APPLICATIONS

This application is the U.S. National Phase under 35 U.S.C. §371 of International Application PCT/JP2007/074238, filed Dec. 17, 2007, which was published in a non-English language, which claims priority to JP Application No. 2006-339011, filed Dec. 15, 2006.

FIELD OF THE INVENTION

The present invention relates to a polymer containing fluorine. The present invention also relates to a surface modifier containing a resin composition containing the fluorine polymer. The present invention further relates to a film obtained with a surface modifier containing a resin composition containing the fluorine polymer.

DESCRIPTION OF THE RELATED ART

A surface modifier has been variously studied that forms a film on surfaces of various kinds of base materials for protecting the base material and for imparting water repellency, oil repellency, insulating property, non-adhesiveness, antifouling property and the like to the base material. Examples of a method for using the surface modifier include a method of coating a coating composition containing a fluorine resin, a silicone resin or the like on a base material, thereby enhancing the water repellency of the base material.

The compounds for achieving these properties are roughly classified into a fluorine series, a silicone series and a composite series.

As the fluorine series compound, Patent Document 1 discloses a water repelling coating composition containing a thermosetting binder resin having dispersed therein a radical polymerizable monomer having a fluoroalkyl group, but the fluorine resin has poor compatibility with the other resin, and the resulting film is poor in adhesiveness to the base material.

As the silicone series compound, Patent Document 2 discloses a plastic product having a silicone resin mixed therein, but the silicone resin is poor in compatibility with the other resin, and only poor oil repellency is obtained.

As the composite series compound using both the fluorine series and the silicone series, Patent Document 3 discloses a coating composition containing a silicone resin having a fluoroalkyl group, but the composition has such a problem that it is poor in solubility in an ordinary organic solvent, and a fluorine solvent is necessarily used.

Patent Document 1: JP-A-7-102187
Patent Document 2: JP-B-4-103668
Patent Document 3: JP-A-9-151357

SUMMARY OF THE INVENTION

An object of the present invention is to provide a novel polymer that is excellent in water repellency, oil repellency, antifouling property, non-adhesiveness, releasing property, lubricating property, abrasion resistance, corrosion resistance, electric insulating property, antireflection property, flame retardancy, antistatic property, chemical resistance, weather resistance and the like, and can be used as an ultraviolet ray-curable surface modifier and the like.

As a result of earnest investigations made by the inventors in consideration of the aforementioned view points, it has been found that an addition copolymer that contains, as essential components, a constitutional unit derived from fluorosilsesquioxane having one addition polymerizable functional group in a molecule, a constitutional unit derived from organopolysiloxane having an addition polymerizable functional group, and a constitutional unit derived from an addition polymerizable monomer and having a group having a polymerizable unsaturated bond on a side chain is excellent in water repellency and oil repellency and is useful as a surface modifier.

The present invention provides an addition copolymer that contains, as essential components, a constitutional unit derived from fluorosilsesquioxane having one addition polymerizable functional group in a molecule, a constitutional unit derived from organopolysiloxane having an addition polymerizable functional group, and a constitutional unit derived from an addition polymerizable monomer and having a group having a polymerizable unsaturated bond on a side chain. The present invention provides novel applications of the fluorine polymer. Examples of the novel applications include the use of the addition copolymer that contains, as essential components, a constitutional unit derived from fluorosilsesquioxane having one addition polymerizable functional group in a molecule, a constitutional unit derived from organopolysiloxane having an addition polymerizable functional group, and a constitutional unit derived from an addition polymerizable monomer which bonds a group having a polymerizable unsaturated bond on a side chain, as a surface modifier. The polymer of the present invention can be radically cured with an ultraviolet ray, and thus can be favorably used as an ultraviolet ray-curable surface modifier.

The present invention relates to a polymer, a resin composition and a film according to the following aspects.

(1) A polymer containing: a constitutional unit A that is derived from fluorosilsesquioxane having one addition polymerizable functional group in a molecule; a constitutional unit B that is derived from organopolysiloxane having an addition polymerizable functional group; and a constitutional unit C that is derived from an addition polymerizable monomer and has a group having a polymerizable unsaturated bond on a side chain, and optionally containing a constitutional unit D that is derived from an addition polymerizable monomer other than the fluorosilsesquioxane having one addition polymerizable functional group in a molecule, the organopolysiloxane having an addition polymerizable functional group and the addition polymerizable monomer having a functional group capable of introducing a group having a polymerizable unsaturated bond.

(2) The polymer according to the item (1), wherein the fluorosilsesquioxane having one addition polymerizable group in a molecule is represented by the following formula (1):

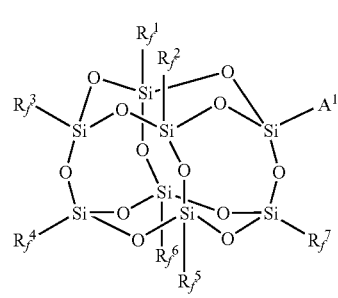

wherein $R_f^1$ to $R_f^7$ each independently represent fluoroalkyl having 1 to 20 carbon atoms, in which arbitrary methylene may be replaced by oxygen, fluoroaryl having 6 to 20 carbon atoms, in which at least one hydrogen is replaced by fluorine or trifluoromethyl, or fluoroarylalkyl having 7 to 20 carbon atoms, in which at least one hydrogen in aryl is replaced by fluorine or trifluoromethyl; and $A^1$ represents an addition polymerizable functional group.

(3) The polymer according to the item (2), wherein in the formula (1), $R_f^1$ to $R_f^7$ each independently represent 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrodecyl, pentacosafluoro-1,1,2,2-tetrahydrodecyl, (3-heptafluoroisopropoxy)propyl, pentafluorophenylpropyl, pentafluorophenyl, or α,α,α-trifluoromethylphenyl.

(4) The polymer according to the item (2), wherein in the formula (1), $R_f^1$ to $R_f^7$ each independently represent 3,3,3-trifluoropropyl, 3,3,4,4,5,5,6,6,6-nonafluorohexyl, or tridecafluoro-1,1,2,2-tetrahydrooctyl.

(5) The polymer according to any one of the items (1) to (4), wherein the organopolysiloxane having an addition polymerizable functional group is represented by the following formula (2):

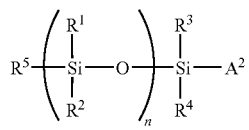

(2)

wherein n represents an integer of 1 to 1,000; $R^1$, $R^2$, $R^3$, $R^4$ and $R^5$ each independently represent hydrogen, alkyl having 1 to 30 carbon atoms, in which arbitrary hydrogen may be replaced by fluorine, and arbitrary —CH$_2$— may be replaced by —O— or cycloalkylene, substituted or unsubstituted aryl, or arylalkyl containing substituted or unsubstituted aryl and alkylene, in which arbitrary hydrogen may be replaced by fluorine, and arbitrary —CH$_2$— may be replaced by —O— or cycloalkylene; and $A^2$ represents an addition polymerizable functional group.

(6) The polymer according to the item (5), wherein in the formula (2), $R^1$ and $R^2$ each independently represent hydrogen, phenyl or alkyl having 1 to 8 carbon atoms, in which arbitrary hydrogen may be replaced by fluorine; $R^3$ and $R^4$ each independently represent alkyl having 1 to 20 carbon atoms, in which arbitrary hydrogen may be replaced by fluorine, aryl having 6 to 20 carbon atoms, in which arbitrary hydrogen may be replaced by fluorine, or arylalkyl having 7 to 20 carbon atoms, in which arbitrary hydrogen may be replaced by fluorine; and $R^5$ represents alkyl having 1 to 20 carbon atoms, in which arbitrary hydrogen may be replaced by fluorine, aryl having 6 to 20 carbon atoms, in which arbitrary hydrogen may be replaced by fluorine, or arylalkyl having 7 to 20 carbon atoms, in which arbitrary hydrogen may be replaced by fluorine.

(7) The polymer according to the item (5), wherein in the formula (2), $R^1$ and $R^2$ each independently represent methyl, phenyl, or 3,3,3-trifluoropropyl; $R^3$ and $R^4$ each independently represent methyl or phenyl; and $R^5$ represents methyl, ethyl, propyl, butyl, isobutyl, phenyl, 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrodecyl, pentacosafluoro-1,1,2,2-tetrahydrotetradecyl, (3-heptafluoroisopropoxy)propyl, pentafluorophenylpropyl, pentafluorophenyl, or α,α,α-trifluoromethylphenyl.

(8) The polymer according to the item (5), wherein in the formula (2), $R^1$, $R^2$, $R^3$ and $R^4$ each are methyl simultaneously.

(9) The polymer according to any one of the items (5) to (8), wherein $A^1$ in the formula (1) and the $A^2$ in the formula (2) are each a radical polymerizable functional group.

(10) The polymer according to the item (9), wherein $A^1$ in the formula (1) and the $A^2$ in the formula (2) each contain (meth)acryl or styryl.

(11) The polymer according to the item (10), wherein $A^1$ in the formula (1) is represented by the following formula (3) or (5), and the $A^2$ in the formula (2) is represented by the following formula (3), (4), or (5):

(3)

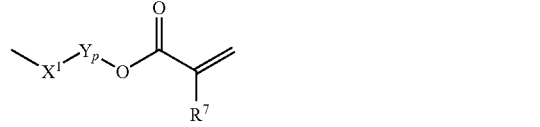

(4)

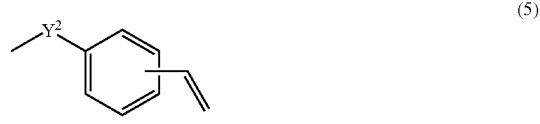

(5)

wherein in the formula (3), $Y^1$ represents alkylene having 2 to 10 carbon atoms; and $R^6$ represents hydrogen, alkyl having 1 to 5 carbon atoms, or aryl having 6 to 10 carbon atoms, in the formula (4), $R^7$ represents hydrogen, alkyl having 1 to 5 carbon atoms, or aryl having 6 to 10 carbon atoms; $X^1$ represents alkylene having 2 to 20 carbon atoms; Y represents —OCH$_2$CH$_2$—, —OCHCH$_3$CH$_2$—, or —OCH$_2$CH (CH$_3$)—; and p represents an integer of 0 to 3, and in the formula (5), $Y^2$ represents a single bond or alkylene having 1 to 10 carbon atoms.

(12) The polymer according to the item (11), wherein in the formula (3), $Y^1$ represents alkylene having 2 to 6 carbon atoms; and $R^6$ represents hydrogen or methyl, in the formula (4), $X^1$ represents —CH$_2$CH$_2$CH$_2$—; Y represents —OCH$_2$CH$_2$—; p represents 0 or 1; and $R^7$ represents hydrogen or methyl, and in the formula (5), $Y^2$ represents a single bond or alkylene having 1 or 2 carbon atoms.

(13) The polymer according to any one of the items (1) to (12), wherein the group having a polymerizable unsaturated bond in the constitutional unit C is a radical polymerizable functional group.

(14) The polymer according to any one of the items (1) to (13), wherein the group having a polymerizable unsaturated bond in the constitutional unit C is (meth)acryl or styryl.

(15) A resin composition containing the polymer according to any one of the items (1) to (14), and at least one resin selected from a thermoplastic resin, a thermosetting resin and an active radiation-curable resin.

(16) A surface modifier containing the polymer according to any one of the items (1) to (14) or the resin composition according to the item (15).

(17) A film containing the surface modifier according to the item (16).

The fluorine polymer and the resin composition containing the polymer according to the present invention are excellent in water repellency, oil repellency, antifouling property, non-adhesiveness, releasing property, lubricating property, abrasion resistance, corrosion resistance, electric insulating property, antireflection property, flame retardancy, antistatic property, chemical resistance, weather resistance and the like, and can be used as an ultraviolet ray-curable surface modifier by applying to surfaces of various kinds of base materials.

DESCRIPTION OF THE PREFERRED EMBODIMENTS

In the present invention, the term "addition polymerizability" means capability of undergoing addition polymerization, the term "addition polymerizable monomer" means a monomer that is capable of undergoing addition polymerization, and the term "addition polymerizable functional group" means a functional group that is capable of undergoing addition polymerization.

The polymer of the present invention contains the constitutional unit A, the constitutional unit B and the constitutional unit C, and/or the constitutional unit D. In the polymer, the constitutional unit A is derived from fluorosilsesquioxane having one addition polymerizable functional group in a molecule, the constitutional unit B is derived from organopolysiloxane having an addition polymerizable functional group, the constitutional unit C is derived from an addition polymerizable monomer and has a group having a polymerizable unsaturated bond on a side chain, and the constitutional unit D is derived from an addition polymerizable monomer other than the addition polymerizable monomers used as the constitutional unit A, the constitutional unit B and the constitutional unit C. The term "a unit derived from a monomer" referred herein means a polymerization residual group obtained from the monomer when the monomer constitutes a polymer. The molar fraction (%) a of the constitutional unit A, the molar fraction (%) b of the constitutional unit B, the molar fraction (%) c of the constitutional unit C and the molar fraction (%) d of the constitutional unit D in the polymer satisfy the following expressions, respectively.

$0 < a < 100$ $0 < b < 100$ $0 < c < 100$ $0 \leq d < 100$ $a+b+c+d=100$

The polymer of the present invention can be obtained by polymerizing fluorosilsesquioxane having one addition polymerizable functional group in a molecule ($\alpha$), an addition polymerizable monomer having organopolysiloxane ($\beta$) and an addition polymerizable monomer having a group having a polymerizable unsaturated bond, but in order to introduce a group having a polymerizable unsaturated bond more efficiently, it is preferred that the polymer is obtained, for example, in such a manner that an addition polymerizable monomer having a fluorine atom ($\alpha$), organopolysiloxane having an addition polymerizable group ($\beta$) and an addition polymerizable monomer having a functional group capable of introducing a group having a polymerizable unsaturated bond are copolymerized to provide a polymer as a precursor, and then a group having a polymerizable unsaturated bond is introduced to the precursor through the functional group.

Explanation about Constitutional Unit A

<Fluorosilsesquioxane Having One Addition Polymerizable Functional Group in Molecule ($\alpha$)>

Fluorosilsesquioxane has a silsesquioxane skeleton in the molecular structure. Silsesquioxane is a generic name of polysiloxane represented by $(R-SiO_{1.5})_n$ (wherein R represents an arbitrary substituent). The structure of silsesquioxane is generally classified depending on the Si—O—Si skeleton thereof into a random structure, a ladder structure and a cage structure. The cage structure is further classified into $T_8$ type, $T_{10}$ type, $T_{12}$ type and the like. Among these, fluorosilsesquioxane that is used in the present invention preferably has a cage structure of $T_8$ type $((R-SiO_{1.5})_8)$.

The fluorosilsesquioxane has one addition polymerizable functional group. In other words, one of the substituents R in silsesquioxane $(R-SiO_{1.5})_n$ is an addition polymerizable functional group.

Examples of the addition polymerizable functional group include a group having a radical polymerizable functional group of terminal olefin type or internal olefin type; a group having a cationic polymerizable functional group, such as vinyl ether and propenyl ether; and a group having an anion polymerizable functional group, such as vinyl carboxyl and cyanoacryloyl, and preferred examples thereof include a radical polymerizable functional group.

The radical polymerizable functional group is not particularly limited as long as it is a group capable of undergoing radical polymerization, and examples thereof include methacryloyl, acryloyl, allyl, styryl, $\alpha$-methylstyryl, vinyl, vinyl ether, vinylester, acrylamide, methacrylamide, N-vinylamide, maleate ester, fumarate ester and N-substituted maleimide, and among these, a group containing (meth)acryl or styryl is preferred. The term "(meth)acryl" referred herein is a generic name including acryl and methacryl, and thus means acryl and/or methacryl. The rule is applied to the following descriptions.

Examples of the radical polymerizable functional group having (meth)acryl include a group represented by the formula (3).

In the formula (3), $Y^1$ represents alkylene having 2 to 10 carbon atoms, preferably alkylene having 2 to 6 carbon atoms, and more preferably alkylene having 3 carbon atoms (propylene). $R^6$ represents hydrogen, alkyl having 1 to 5 carbon atoms, or aryl having 6 to 10 carbon atoms, preferably hydrogen or alkyl having 1 to 3 carbon atoms, and particularly preferably hydrogen or methyl. The alkyl having 1 to 5 carbon atoms may be linear or branched.

Examples of the radical polymerizable functional group having styryl include a group represented by the following formula (5). In the formula (5), $Y^2$ represents a single bond or alkylene having 1 to 10 carbon atoms, preferably a single bond or alkylene having 1 to 6 carbon atoms, more preferably a single bond or alkylene having 1 or 2 carbon atoms, and particularly preferably a single bond or alkylene having 2 carbon atoms (ethylene). The vinyl group may be bonded to any carbon atom in the benzene ring, and is preferably bonded to the carbon atom at the p-position with respect to $Y^2$.

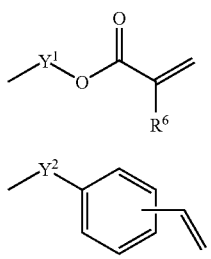

(3)

(5)

The fluorosilsesquioxane has at least one of fluoroalkyl, fluoroarylalkyl or fluoroaryl. Accordingly, at least one of the substituents R in silsesquioxane $(R-SiO_{1.5})_n$, and preferably all the substituents R other than the above addition polymerizable functional group, are fluoroalkyl, fluoroarylalkyl and/or fluoroaryl.

The fluoroalkyl may be linear or branched. The carbon number of the fluoroalkyl is 1 to 20, and preferably 3 to 14. In the fluoroalkyl, arbitrary methylene may be replaced by oxygen. The methylene herein includes —$CH_2$—, —CFH— and —$CF_2$—. Accordingly, the expression "arbitrary methylene may be replaced by oxygen" means that —$CH_2$—, —CFH— or —$CF_2$— may be replaced by —O—. In the fluoroalkyl, however, two oxygen atoms are not bonded to each other, i.e., the structure —O—O— is excluded. In other words, the fluoroalkyl may have an ether bond. In a preferred example of the fluoroalkyl, methylene adjacent to the Si atom is not replaced by oxygen, and the terminal group opposite to the Si atom is $CF_3$. It is preferred that —$CF_2$— is replaced by oxygen rather than the case where —$CH_2$— or —CFH— is replaced by oxygen. Preferred examples of the fluoroalkyl include 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrodecyl, pentacosafluoro-1,1,2,2-tetrahydrodecyl and (3-heptafluoroisopropoxy)propyl. Further preferred examples among these include perfluoroalkylethyl, which may be a group having a fluoroalkyl group bonded through —$CH_2$—$CH_2$— or a group having a fluoroalkyl group bonded through —$CH_2$—.

The fluoroarylalkyl is alkyl containing aryl containing fluorine, and the carbon number thereof is preferably 7 to 20, and more preferably 7 to 10. As for fluorine contained, arbitrary one or two or more hydrogen atoms in the aryl are replaced by fluorine or trifluoromethyl. Examples of the aryl moiety include phenyl, naphthyl and heteroaryl, and examples of the alkyl moiety include methyl, ethyl and propyl.

The fluoroaryl is aryl, in which arbitrary one or two or more hydrogen atoms are replaced by fluorine or trifluoromethyl, and the carbon number thereof is preferably 6 to 20, and more preferably 6. Examples of the aryl include phenyl, naphthyl and heteroaryl. Specific examples thereof include fluorophenyl, such as pentafluorophenyl, and trifluoromethylphenyl.

Among the fluoroalkyl, fluoroarylalkyl or fluoroaryl contained in the fluorosilsesquioxane, fluoroalkyl is preferred, perfluoroalkylethyl is more preferred, and 3,3,3-trifluoropropyl, 3,3,4,4,5,5,6,6,6-nonafluorohexyl, and tridecafluoro-1,1,2,2-tetrahydrooctyl are further preferred.

As described above, it is preferred that the fluorosilsesquioxane has a $T_8$ type structure, has one addition polymerizable functional group, has one or more fluoroalkyl, fluoroarylalkyl and/or fluoroaryl, and is represented by the formula (1):

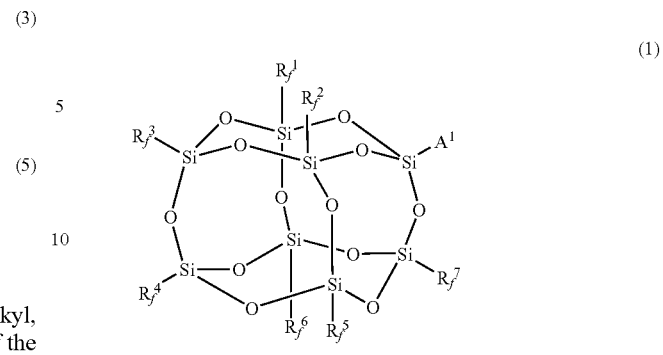

(1)

In the formula (1), $A^1$ represents an addition polymerizable functional group, and preferably the aforementioned radical polymerizable functional group, and $R_f^1$ to $R_f^7$ each independently represent preferably the aforementioned fluoroalkyl, fluoroarylalkyl and/or fluoroaryl. $R_f^1$ to $R_f^7$ each may be groups different from each other or may be the same groups.

In the formula (1), $R_f^1$ to $R_f^7$ each independently represent preferably 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrodecyl, pentacosafluoro-1,1,2,2-tetrahydrodecyl, (3-heptafluoroisopropoxy) propyl, pentafluorophenylpropyl, pentafluorophenyl, or α,α, α-trifluoromethylphenyl, and $R_f^1$ to $R_f^7$ each independently represent more preferably 3,3,3-trifluoropropyl, 3,3,4,4,5,5,6,6,6-nonafluorohexyl or tridecafluoro-1,1,2,2-tetrahydrooctyl.

Explanation about Constitutional Unit B

<Organopolysiloxane Having Addition Polymerizable Functional Group>

Organopolysiloxane (which may be hereinafter referred to as silicone or polysiloxane) exemplified by polydimethylsiloxane includes two types, in which one has polymerizable functional groups at both terminals, and the other has a polymerizable functional group at one terminal, and examples of the functional group at both terminals or one terminal include such functional groups as amino, hydroxyl, methacryloxy, carboxyl, glycidyl, epoxycyclohexyl and oxetanyl. The organopolysiloxane having polymerizable functional groups at both terminals can introduce a silicone component into a main chain of an organic polymer, and the organopolysiloxane having a polymerizable functional group at one terminal can graft a silicone component to a side chain of an organic polymer. The polymer thus obtained exhibits characteristics that are peculiar to silicone, such as water repellency, releasing property, lubricating property, low friction property, anti-thrombogenic property, heat resistance, electric characteristics, flexibility, oxygen permeability and radiation resistance, and is often used in the field of electronic materials, the field of cosmetics and the medical field.

The organopolysiloxane having an addition polymerizable functional group (β) as a raw material monomer of the polymer of the present invention preferably has a molecular structure represented by the formula (2):

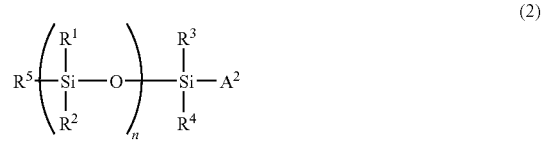

(2)

In the organopolysiloxane (β) used in the present invention represented by the formula (2), n represents an integer of 1 to 1,000; $R^1$, $R^2$, $R^3$, $R^4$ and $R^5$ each independently represent hydrogen, alkyl having 1 to 30 carbon atoms, in which arbitrary hydrogen may be replaced by fluorine, and arbitrary —$CH_2$— may be replaced by —O— or cycloalkylene, substituted or unsubstituted aryl, or arylalkyl composed of substituted or unsubstituted aryl and alkylene in which arbitrary hydrogen may be replaced by fluorine, and arbitrary —$CH_2$— may be replaced by —O— or cycloalkylene; and $A^2$ represents an addition polymerizable functional group.

It is preferred in the organopolysiloxane (β) used in the present invention that in the formula (2), $R^1$ and $R^2$ each independently represent hydrogen or alkyl having 1 to 8 carbon atoms, in which arbitrary hydrogen may be replaced by fluorine; $R^3$ and $R^4$ each independently represent alkyl having 1 to 20 carbon atoms, in which arbitrary hydrogen may be replaced by fluorine, aryl having 6 to 20 carbon atoms, in which arbitrary hydrogen may be replaced by fluorine, or arylalkyl having 7 to 20 carbon atoms, in which arbitrary hydrogen may be replaced by fluorine; and $R^5$ represents alkyl having 1 to 20 carbon atoms, in which arbitrary hydrogen may be replaced by fluorine, aryl having 6 to 20 carbon atoms, in which arbitrary hydrogen may be replaced by fluorine, or arylalkyl having 7 to 20 carbon atoms, in which arbitrary hydrogen may be replaced by fluorine.

It is also preferred in the organopolysiloxane (β) used in the present invention that in the formula (2), $R^1$ and $R^2$ each independently represent methyl, phenyl, or 3,3,3-trifluoropropyl; $R^3$ and $R^4$ each independently represent methyl or phenyl; and $R^5$ represents methyl, ethyl, propyl, butyl, isobutyl, phenyl, 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrodecyl, pentacosafluoro-1,1,2,2-tetrahydrotetradecyl, (3-heptafluoroisopropoxy)propyl, pentafluorophenylpropyl, pentafluorophenyl, or α,α,α-trifluoromethylphenyl.

It is more preferred in the organopolysiloxane having an addition polymerizable functional group (β) used in the present invention that in the formula (2), $R^1$, $R^2$, $R^3$ and $R^4$ each are methyl simultaneously. It is preferred in the formula (2) that $A^2$ represents a radical polymerizable functional group, it is more preferred that $A^2$ contains (meth)acryl or styryl, and it is further preferred that $A^2$ is represented by the formula (3), (4), or (5):

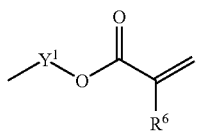

(3)

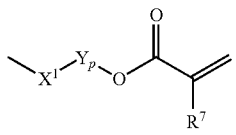

(4)

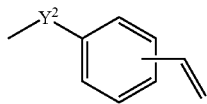

(5)

In the formula (3), $Y^1$ represents alkylene having 2 to 10 carbon atoms; and $R^6$ represents hydrogen, alkyl having 1 to 5 carbon atoms, or aryl having 6 to 10 carbon atoms. In the formula (4), $R^7$ represents hydrogen, alkyl having 1 to 5 carbon atoms, or aryl having 6 to 10 carbon atoms; $X^1$ represents alkylene having 2 to 20 carbon atoms; Y represents —$OCH_2CH_2$—, —$OCHCH_3CH_2$—, or —$OCH_2CH(CH_3)$—; and p represents an integer of 0 to 3. In the formula (5), $Y^2$ represents a single bond or alkylene having 1 to 10 carbon atoms. The alkyl having 1 to 5 carbon atoms may be linear or branched.

In the present invention, it is preferred that in the formula (3), $Y^1$ represents alkylene having 2 to 6 carbon atoms; and $R^6$ represents hydrogen or methyl, it is preferred that in the formula (4), $X^1$ represents —$CH_2CH_2CH_2$—; Y represents —$OCH_2CH_2$—; p represents 0 or 1; and $R^7$ represents hydrogen or methyl, and it is preferred that in the formula (5), $Y^2$ represents a single bond or alkylene having 1 or 2 carbon atoms.

Examples of the organopolysiloxane (β) that is preferably used in the present invention include Silaplane FM0711 (produced by Chisso Corporation), Silaplane FM0721 (produced by Chisso Corporation), Silaplane FM0725 (produced by Chisso Corporation), Silaplane TM0701 (produced by Chisso Corporation) and Silaplane TM0701T (produced by Chisso Corporation).

Explanation about Constitutional Unit C

<Addition Polymerizable Monomer Having Functional Group Capable of Introducing Group Having Polymerizable Unsaturated Bond>

As described above, the polymer containing a group having a polymerizable unsaturated bond on a side chain of the present invention can be obtained from a polymer having a functional group capable of introducing a group having a polymerizable unsaturated bond as a precursor. Examples of the functional group capable of introducing a group having a polymerizable unsaturated bond include a group having active hydrogen and a monovalent functional group having a cyclic ether. Active hydrogen is such hydrogen among hydrogen atoms present in a molecule of an organic compound that is bonded to an atom having electronegativity higher than carbon (such as nitrogen, sulfur and oxygen atoms). Accordingly, preferred examples of the precursor for providing the polymer of the present invention include a polymer containing a group having active hydrogen, and the precursor of the polymer of the present invention can be obtained by using the fluorosilsesquioxane having one addition polymerizable functional group in a molecule (α) and the organopolysiloxane having an addition polymerizable functional group (β), along with an addition polymerizable monomer containing a group having active hydrogen or a monovalent functional group having a cyclic ether (ε) as an essential component.

Examples of the group having active hydrogen include —OH, —SH, —COOH, —NH, —$NH_2$, —$CONH_2$, —NHCONH—, —NHCOO—, $Na^+(CH(COOC_2H_5))$, —$CH_2NO_2$, OOH, —SiOH, —$B(OH)_2$, and —$PH_3$. Among these, carboxyl, amino and hydroxyl are preferred, and hydroxyl is more preferred. The addition polymerizable monomer containing a group having active hydrogen (ε) may be such a compound that has a group having active hydrogen and an addition polymerizable double bond in a molecule, and may be any of a vinyl compound, a vinylidene compound and a vinylene compound that contain a group having active hydrogen. Preferred examples of the addition polymerizable monomer (ε) include an acrylic acid derivative and a styrene derivative that contain a group having active hydrogen.

Examples of the monovalent functional group containing a cyclic ether include glycidyl, epoxycyclohexyl and oxetanyl.

Examples of the addition polymerizable monomer containing a group having active hydrogen include monomers disclosed in JP-A-9-208681, JP-A-2002-348344 and JP-A-2006-158961.

Specific examples of the monomer include the following.

Examples of a carboxyl group-containing vinyl monomer include (meth)acrylic acid, maleic acid, maleic anhydride, a monoalkyl maleate, fumaric acid, a monoalkyl fumarate, crotonic acid, itaconic acid, a monoalkyl itaconate, a glycol itaconate monoether, citraconic acid, a monoalkyl citraconate, hexadecyl(meth)acrylate and cinnamic acid.

Examples of a hydroxyl group-containing vinyl monomer include a hydroxyl group-containing monofunctional vinyl monomer and a hydroxyl group-containing polyfunctional vinyl monomer. Examples of the hydroxyl group-containing monofunctional vinyl monomer include a vinyl monomer having one vinyl group, such as hydroxystyrene, N-methylol (meth)acrylamide, hydroxyethyl(meth)acrylate, hydroxypropyl(meth)acrylate, 4-hydroxybutyl(meth)acrylate, polyethylene glycol mono(meth)acrylate, polypropylene glycol mono(meth)acrylate, (meth)allyl alcohol, crotyl alcohol, isocrotyl alcohol, 1-buten-3-ol, 2-buten-1-ol, 2-buten-1,4-diol, propargyl alcohol, 2-hydroxyethyl propenyl ether (2-propenoxyethanol), 16-hydroxyhexadecane methacrylate and sucrose allyl ether. Examples of the hydroxyl group-containing polyfunctional vinyl monomer include a vinyl monomer having plural vinyl groups, such as glycerin di(meth)acrylate, trimethylolpropane di(meth)acrylate, pentaerythritol tri(meth)acrylate, diglycerin tri(meth)acrylate, sorbitan tri(meth)acrylate, dipentaerythritol penta(meth)acrylate, tetraglycerin penta(meth)acrylate, glycerin di(meth)allyl ether, trimethylolpropane di(meth)allyl ether, pentaerythritol tri(meth)allyl ether, diglycerin tri(meth)allyl ether, sorbitan tri(meth)allyl ether, dipentaerythritol penta(meth)allyl ether and tetraglycerin penta(meth)allyl ether.

Examples of an amino group-containing vinyl monomer include aminoethyl(meth)acrylate, aminoisopropyl(meth)acrylate, aminobutyl(meth)acrylate, aminohexyl(meth)acrylate, N-ethylamino(meth)acrylamide, (meth)acrylamine, crotylamine, aminostyrene, methyl α-acetaminoacrylate, N-allylphenylenediamine and 16-methacryloylhexadecaneamine.

Examples of the addition polymerizable monomer, which is a (meth)acrylic acid derivative having a monovalent functional group containing a cyclic ether, include an epoxy-containing (meth)acrylate, such as glycidyl(meth)acrylate; an alicyclic epoxy-containing (meth)acrylate, such as 3,4-epoxycyclohexylmethyl(meth)acrylate; an oxetanyl-containing (meth)acrylate, such as 3-ethyl-3-(meth)acryloyloxymethyloxetane; and a dioxolane-containing (meth)acrylate, such as 4-(meth)acryloyloxymethyl-2-methyl-2-ethyl-1,3-dioxolane.

Explanation about Constitutional Unit D

<Optional Addition Polymerizable Monomer (δ)>

In the precursor of the polymer of the present invention, an addition polymerizable monomer (δ) other than the addition polymerizable monomers (α), (β) and (ε) may be used depending on necessity, in an arbitrary ratio in addition to the monomers (α), (β) and (ε), for controlling the compatibility with resins, the leveling property, the content of the group having a polymerizable unsaturated bond in the copolymer, and the like.

Examples of the addition polymerizable monomer that does not have a group having active hydrogen (δ) include a (meth)acrylic acid compound that has one addition polymerizable double bond and does not have a group having active hydrogen, and a styrene compound that has one addition polymerizable double bond and does not have a group having active hydrogen. Specific examples of the (meth)acrylic acid compound include an alkyl(meth)acrylate, such as methyl (meth)acrylate, ethyl(meth)acrylate, n-propyl(meth)acrylate, isopropyl(meth)acrylate, butyl(meth)acrylate, isobutyl(meth)acrylate, t-butyl(meth)acrylate, n-pentyl(meth)acrylate, n-hexyl(meth)acrylate, cyclohexyl(meth)acrylate, n-heptyl(meth)acrylate, n-octyl(meth)acrylate, 2-ethylhexyl(meth)acrylate, nonyl(meth)acrylate, decyl(meth)acrylate, dodecyl(meth)acrylate and stearyl(meth)acrylate; an aryl (meth)acrylate, such as phenyl(meth)acrylate and tolyl(meth)acrylate; an arylalkyl(meth)acrylate, such as benzyl(meth)acrylate; an alkoxyalkyl(meth)acrylate, such as 2-methoxyethyl(meth)acrylate, 3-methoxypropyl(meth)acrylate and 3-methoxybutyl(meth)acrylate; and an ethylene oxide adduct of (meth)acrylic acid.

Examples of the (meth)acrylic acid compound that has one addition polymerizable double bond and does not have a group having active hydrogen also include a (meth)acrylic acid compound that has a silsesquioxane skeleton. Specific examples of the (meth)acrylic acid compound having a silsesquioxane skeleton include 3-(3,5,7,9,11,13,15-heptaethylpentacyclo-[9.5.1.1$^{3,9}$.1$^{5,15}$.1$^{7,13}$]octasiloxan-1-yl)propyl (meth)acrylate, 3-(3,5,7,9,11,13,15-heptaisobutylpentacyclo-[9.5.1.1$^{3,9}$.1$^{5,15}$.1$^{7,13}$]octasiloxan-1-yl)propyl(meth)acrylate, 3-(3,5,7,9,11,13,15-heptaisooctylpentacyclo-[9.5.1.1$^{3,9}$.1$^{5,15}$.1$^{7,13}$]octasiloxan-1-yl)propyl(meth)acrylate, 3-(3,5,7,9,11,13,15-heptacyclopentylpentacyclo-[9.5.1.1$^{3,9}$.1$^{5,15}$.1$^{7,13}$]octasiloxan-1-yl)propyl(meth)acrylate, 3-(3,5,7,9,11,13,15-heptaphenylpentacyclo-[9.5.1.1$^{3,9}$.1$^{5,15}$.1$^{7,13}$]octasiloxan-1-yl)propyl(meth)acrylate, 3-((3,5,7,9,11,13,15-heptaethylpentacyclo-[9.5.1.1$^{3,9}$.1$^{5,15}$.1$^{7,13}$]octasiloxan-1-yloxy)dimethylsilyl)propyl(meth)acrylate, 3-((3,5,7,9,11,13,15-heptaisobutylpentacyclo-[9.5.1.1$^{3,9}$.1$^{5,15}$.1$^{7,13}$]octasiloxan-1-yloxy)dimethylsilyl)propyl(meth)acrylate, 3-((3,5,7,9,11,13,15-heptaisooctylpentacyclo-[9.5.1.1$^{3,9}$.1$^{5,15}$.1$^{7,13}$]octasiloxan-1-yloxy)dimethylsilyl)propyl(meth)acrylate, 3-((3,5,7,9,11,13,15-heptacyclopentyl-pentacyclo[9.5.1.1$^{3,9}$.1$^{5,15}$.1$^{7,13}$]octasiloxan-1-yloxy)-dimethylsilyl)propyl(meth)acrylate and 3-((3,5,7,9,11,13,15-heptaphenylpentacyclo-[9.5.1.1$^{3,9}$.1$^{5,15}$.1$^{7,13}$]octasiloxan-1-yloxy)dimethylsilyl)propyl(meth)acrylate.

Specific examples of the styrene compound that has one addition polymerizable double bond and does not have a group having active hydrogen include styrene, vinyltoluene, α-methylstyrene and p-chlorostyrene.

Examples of the styrene compound that has one addition polymerizable double bond and does not have a group having active hydrogen also include a styrene compound that contains silsesquioxane. Specific examples of the styrene compound containing silsesquioxane include an octasiloxane (T$_8$ type silsesquioxane) having a 4-vinylphenyl group, such as 1-(4-vinylphenyl)-3,5,7,9,11,13,15-heptaethylpentacyclo-[9.5.1.1$^{3,9}$.1$^{5,15}$.1$^{7,13}$]octasiloxane, 1-(4-vinylphenyl)-3,5,7,9,11,13,15-heptaisobutylpentacyclo-[9.5.1.1$^{3,9}$.1$^{5,15}$.1$^{7,13}$]octasiloxane, 1-(4-vinylphenyl)-3,5,7,9,11,13,15-heptaisooctylpentacyclo-[9.5.1.1$^{3,9}$.1$^{5,15}$.1$^{7,13}$]octasiloxane, 1-(4-vinylphenyl)-3,5,7,9,11,13,15-heptacyclopentylpentacyclo-[9.5.1.1$^{3,9}$.1$^{5,15}$.1$^{7,13}$]octasiloxane and 1-(4-vinylphenyl)-3,5,7,9,11,13,15-heptaphenylpentacyclo-[9.5.1.1$^{3,9}$.1$^{5,15}$.1$^{7,13}$]octasiloxane; and an octasiloxane (T$_8$ type silsesquioxane) having a 4-vinylphenylethyl group, such as 3-(3,5,7,9,11,13,15-heptaethylpentacyclo-[9.5.1.1$^{3,9}$.1$^{5,15}$.1$^{7,13}$]octasiloxan-1-yl)ethylstyrene, 3-(3,5,7,9,11,13,15-heptaisobutylpentacyclo-[9.5.1.1$^{3,9}$.1$^{5,15}$.1$^{7,13}$]octasiloxan- 1-yl)ethylstyrene, 3-(3,5,7,9,11,13,15-heptaisooctylpentacyclo-[9.5.1.1$^{3,9}$.1$^{5,15}$.1$^{7,13}$]octasiloxan-1-yl)ethylstyrene, 3-(3,5,7,9,11,13,15-heptacyclopentylpentacyclo-[9.5.1.1$^{3,9}$.1$^{5,15}$.1$^{7,13}$]octasiloxan-1-yl)ethylstyrene, 3-(3,5,7,9,11,13,15-heptaphenylpentacyclo-[9.5.1.1$^{3,9}$.1$^{5,15}$.1$^{7,13}$]octasiloxan-1-yl)ethylstyrene, 3-((3,5,7,9,11,13,15-heptaethylpentacyclo-[9.5.1.1$^{3,9}$.1$^{5,15}$.1$^{7,13}$]octasiloxan-1-yloxy)dimethylsilyl)-ethylstyrene, 3-((3,5,7,9,11,13,15-heptaisobutylpentacyclo-[9.5.1.1$^{3,9}$.1$^{5,15}$.1$^{7,13}$]octasiloxan-1-yloxy)dimethylsilyl)-ethylstyrene, 3-((3,5,7,9,11,13,15-heptaisooctylpentacyclo-[9.5.1.1$^{3,9}$.1$^{5,15}$.1$^{7,13}$]octasiloxan-1-yloxy)dimethylsilyl)-ethylstyrene, 3-((3,5,7,9,11,13,15-heptacyclopentylpentacyclo-[9.5.1.1$^{3,9}$.1$^{5,15}$.1$^{7,13}$]octasiloxan-1-yloxy)dimethylsilyl)-ethylstyrene and 3-((3,5,7,9,11,13,15-heptaphenylpentacyclo-[9.5.1.1$^{3,9}$.1$^{5,15}$.1$^{7,13}$]octasiloxan-1-yloxy)dimethylsilyl)-ethylstyrene.

Examples of the optional addition polymerizable monomer further include a macromonomer that has a main chain derived from styrene, a (meth)acrylate ester, siloxane, an alkylene oxide, such as ethylene oxide and propylene oxide, or the like, and has one polymerizable double bond.

Examples of the addition polymerizable monomer (δ) also include a compound having two addition polymerizable double bonds.

Examples of the compound having two addition polymerizable double bonds include a di(meth)acrylate monomer, such as 1,3-butanediol di(meth)acrylate, 1,4-butanediol di(meth)acrylate, 1,6-hexanediol di(meth)acrylate, polyethylene glycol di(meth)acrylate, diethylene glycol di(meth)acrylate, neopentyl glycol di(meth)acrylate, triethylene glycol di(meth)acrylate, tripropylene glycol di(meth)acrylate, hydroxypivalate ester neopentyl glycol di(meth)acrylate, trimethylolpropane di(meth)acrylate, bis((meth)acryloyloxyethoxy) bisphenol A, bis((meth)acryloyloxyethoxy)tetrabromobisphenol A, bis((meth)acryloxypolyethoxy)bisphenol A, 1,3-bis(hydroxyethyl)-5,5-dimethylhydantoin, 3-methylpentanediol di(meth)acrylate, di(meth)acrylate of a hydroxypivalate ester neopentyl glycol compound and bis((meth)acryloyloxypropyl)tetramethyldisiloxane, and divinylbenzene.

Examples of the compound having two addition polymerizable double bonds include a macromonomer that has a main chain derived from styrene, a (meth)acrylate ester, siloxane, an alkylene oxide, such as ethylene oxide and propylene oxide, or the like, and has two polymerizable double bonds.

Examples of the addition polymerizable monomer (δ) also include a compound having three or more addition polymerizable double bonds. Examples of the compound having three or more addition polymerizable double bonds include trimethylolpropane tri(meth)acrylate, pentaerythritol tri(meth)acrylate, pentaerythritol tetra(meth)acrylate, dipentaerythritol monohydroxypenta(meth)acrylate, tris(2-hydroxyethylisocyanate) tri(meth)acrylate, tris(diethylene glycol)trimerate tri(meth)acrylate, 3,7,14-tris((((meth)acryloyloxypropyl)dimethylsiloxy))-1,3,5,7,9,11,14-heptaetyltricyclo[7.3.3.1$^{5,11}$]-heptacyloxane, 3,7,14-tris((((meth)acryloyloxypropyl)dimethylsiloxy))-1,3,5,7,9,11,14-heptaisobutyltricyclo[7.3.3.1$^{5,11}$]-heptacyloxane, 3,7,14-tris((((meth)acryloyloxypropyl)dimethylsiloxy))-1,3,5,7,9,11,14-heptaisooctyltricyclo[7.3.3.1$^{5,11}$]-heptacyloxane, 3,7,14-tris((((meth)acryloyloxypropyl)dimethylsiloxy))-1,3,5,7,9,11,14-heptacyclopentyltricyclo[7.3.3.1$^{5,11}$]-heptacyloxane, 3,7,14-tris((((meth)acryloyloxypropyl)dimethylsiloxy))-1,3,5,7,9,11,14-heptaphenyltricyclo[7.3.3.1$^{5,11}$]-heptacyloxane, octakis(3-(meth)acryloyloxypropyldimethyl-siloxy)octasilsesquioxane and octakis(3-(meth)acryloyloxypropyl)octasilsesquioxane.

Examples of the compound having three or more addition polymerizable double bonds include a macromonomer that has a main chain derived from styrene, a (meth)acrylate ester, siloxane, an alkylene oxide, such as ethylene oxide and propylene oxide, or the like, and has three or more polymerizable double bonds.

Examples of the addition polymerizable monomer (δ) also include a compound containing fluorine. The compound containing fluorine may be a compound having a group having a fluorine atom and an addition polymerizable double bond in a molecule, and examples thereof include any of a vinyl compound, a vinylidene compound and vinylene compound that have a fluorine atom. Preferred examples thereof include an acrylic acid derivative and a styrene derivative that have a fluorine atom.

Examples of the addition polymerizable monomer having a fluorine atom include a fluoroalkyl(meth)acrylate, a fluorostyrene compound and a fluorine-containing polyether compound.

Examples of the addition polymerizable monomer having a fluorine atom include monomers disclosed in JP-A-10-251352, JP-A-2004-043671, JP-A-2004-155847, JP-A-2005-029743, JP-A-2006-117742, JP-A-2006-299016 and JP-A-2005-350560.

Specific examples of the monomer include the following. Examples of the fluoroalkyl(meth)acrylate include 2,2,2-trifluoroethyl(meth)acrylate, 2,2,3,3-tetrafluoro-n-propyl(meth)acrylate, 2,2,3,3-tetrafluoro-t-pentyl(meth)acrylate, 2,2,3,4,4,4-hexafluorobutyl(meth)acrylate, 2,2,3,4,4,4-hexafluoro-t-hexyl(meth)acrylate, 2,3,4,5,5,5-hexafluoro-2,4-bis(trifluoromethyl)pentyl(meth)acrylate, 2,2,3,3,4,4-hexafluorobutyl(meth)acrylate, 2,2,2,2',2',2'-hexafluoroisopropyl(meth)acrylate, 2,2,3,3,4,4,4-heptafluorobutyl(meth)acrylate, 2,2,3,3,4,4,5,5-octafluoropentyl(meth)acrylate, 2,2,3,3,4,4,5,5,5-nonafluoropentyl(meth)acrylate, 2,2,3,3,4,4,5,5,6,6,7,7-dodecafluoroheptyl(meth)acrylate, 3,3,4,4,5,5,6,6,7,7,8,8-dodecafluorooctyl(meth)acrylate, 3,3,4,4,5,5,6,6,7,7,8,8-tridecafluorooctyl(meth)acrylate, 2,2,3,3,4,4,5,5,6,6,7,7-tridecafluoroheptyl(meth)acrylate, 3,3,4,4,5,5,6,6,7,7,8,8,9,9,10,10-hexadecafluorodecyl(meth)acrylate, 3,3,4,4,5,5,6,6,7,7,8,8,9,9,10,10,10-heptadecafluorodecyl(meth)acrylate, 3,3,4,4,5,5,6,6,7,7,8,8,9,9,10,10,11,11-octadecafluoroundecyl(meth)acrylate, 3,3,4,4,5,5,6,6,7,7,8,8,9,9,10,10,11,11,11-nonadecafluoroundecyl(meth)acrylate and 3,3,4,4,5,5,6,6,7,7,8,8,9,9,10,10,11,11,12,12-eicosafluorododecyl(meth)acrylate.

Examples of the fluorostyrene compound include a fluoroalkylstyrene, such as p-trifluoromethylstyrene, p-heptafluoropropylstyrene and p-pentafluoroethylstyrene.

Examples of the fluorine-containing polyether compound include 1H,1H-perfluoro-3,6-dioxaheptyl(meth)acrylate, 1H,1H-perfluoro-3,6-dioxaoctyl(meth)acrylate, 1H,1H-perfluoro-3,6-dioxadecanyl(meth)acrylate, 1H,1H-perfluoro-3,6,9-trioxadecanyl(meth)acrylate, 1H,1H-perfluoro-3,6,9-trioxaundecanyl(meth)acrylate, 1H,1H-perfluoro-3,6,9-trioxatridecanyl(meth)acrylate, 1H,1H-perfluoro-3,6,9,12-tetraoxatridecanyl(meth)acrylate, 1H,1H-perfluoro-3,6,9,12-tetraoxatetradecanyl(meth)acrylate, 1H,1H-perfluoro-3,6,9,12-tetraoxahexadecanyl(meth)acrylate, 1H,1H-perfluoro-3,6,9,12,15-pentaoxahexadecanyl(meth)acrylate, 1H,1H-perfluoro-3,6,9,12,15-pentaoxaheptadecanyl(meth)acrylate, 1H,1H-perfluoro-3,6,9,12,15-pentaoxanonadecanyl(meth)acrylate, 1H,1H-perfluoro-3,6,9,12,15,18-hexaoxaicosanyl(meth)acrylate, 1H,1H-perfluoro-3,6,9,12,15,18-hexaoxadocosanyl(meth)acrylate, 1H,1H-perfluoro-3, 6,9,12,15,18,21-heptaoxatricosanyl(meth)acrylate and 1H,1H-perfluoro-3,6,9,12,15,18,21-heptaoxapentacosanyl (meth)acrylate.

The addition polymerizable monomer having a fluorine atom can be synthesized by reacting a fluorine compound having a hydroxyl group and an acid halide having an addition polymerizable functional group with each other.

Examples of the fluorine compound having a hydroxyl group include $(HO)C(CF_3)_2CH_3$, $(HO)C(CF_3)_2CH_2CH_3$, a compound having $(HO)C(CF_3)_2CH_2O—CH_2—$ group, and $(HO)C(CF_3)_2CH_2CH_2O—CH_3$.

The compound that can be used is also available from Exfluor Research Corporation.

Examples of the fluorine compound having a hydroxyl group can be synthesized, and the synthesis method is disclosed in JP-A-10-147639.

Examples of the addition polymerizable monomer (δ) also include a compound having a hydrophilic group. Examples thereof include a monomer containing an oxyalkylene group, such as methoxypolyethylene glycol mono(meth)acrylate.

The addition polymerizable monomer (δ) may be used solely or in combination of plural kinds thereof. In the case where plural kinds of the monomers are used in combination, the compositional ratios may be appropriately controlled corresponding to the characteristics of the target polymer.

Precursor of Polymer of the Present Invention

The precursor for providing the polymer of the present invention is an addition copolymer containing, as essential components, a constitutional unit derived from a fluorosilsesquioxane having one addition polymerizable functional group in a molecule (α) (constitutional unit (A)), a constitutional unit derived from an organopolysiloxane having an addition polymerizable functional group (β) (constitutional unit (B)), and a constitutional unit derived from an addition polymerizable monomer containing a group having active hydrogen (ε) (constitutional unit (E)). The precursor may be a regular copolymer, such as a block copolymer, or a random copolymer, and is preferably a random copolymer. The polymer of the present invention may have a crosslinked structure and may be a graft copolymer.

The molar fraction (a) of the constitutional unit (A), the molar fraction (b) of the constitutional unit (B) and the molar fraction (e) of the constitutional unit (E) in the precursor of the polymer of the present invention may be arbitrarily determined. The ratio (a)/(b) may be about from 0.001/99.999 to 99.999/0.001, the ratio (b)/(e) may be about from 0.001/99.999 to 99.999/0.001, and the ratio (a)/(e) may be about from 0.001/99.999 to 99.999/0.001.

The fraction (c) of the constitutional unit (C) contained in the polymer of the present invention is not particularly limited as long as it is within the range of the fraction (e). The polymer of the present invention may contain a group having a polymerizable unsaturated bond in such an amount that provides favorable reactivity with a monomer of a binder resin added upon using as a coating composition for binding to the binder resin.

In the case where the copolymer of the present invention is used as a surface modifier as described later, it is preferred that the ratio (a)/(b) is about 1/99 to 99/1, the ratio (b)/(c) is about 1/99 to 99/1, and the ratio (a)/(c) is about 1/99 to 99/1.

In the case where the polymer of the present invention contains the optional constitutional unit (D), the aforementioned molar fractions of the constitutional unit (A), the constitutional unit (C) (or the constitutional unit (E)), and the constitutional unit (B) contained in the polymer or the precursor thereof in the present invention may be similarly applied.

The weight average molecular weight of the polymer of the present invention varies depending on the content of the constitutional unit (B) and is generally about 1,000 to 1,000,000. The molecular weight distribution (Mw/Mn) of the polymer of the present invention is generally about 1.01 to 2.5.

In the case where plural kinds of monomers are used for each of the fluorosilsesquioxane having one addition polymerizable functional group in a molecule (α), the organopolysiloxane having an addition polymerizable functional group (β), the addition polymerizable monomer containing a group having active hydrogen (ε) and the optional addition polymerizable monomer (δ) added depending on necessity in the precursor of the polymer of the present invention, the ratios of the monomers may be appropriately determined corresponding to characteristics of the target copolymer. The polymer may be obtained from the monomers preferably by radical copolymerization from the standpoint of simplicity and versatility.

The addition polymerization may be carried out by using a polymerization initiator.

Examples of the polymerization initiator used include a radical polymerization initiator, examples of which include an azo compound, such as 2,2'-azobisisobutyronitrile, 2,2'-azobis(2,4-dimethylvaleronitrile), 2,2'-azobis(2-butyronitrile), dimethyl 2,2'-azobisisobutyrate and 1,1'-azobis(cyclohexane-1-carbonitrile); a peroxide compound, such as benzoyl peroxide, lauryl peroxide, octanoyl peroxide, acetyl peroxide, di-t-butyl peroxide, t-butylcumyl peroxide, dicumyl peroxide, t-butyl peroxyacetate, t-butyl peroxybenzoate and t-butyl peroxyneodecanoate; and dithiocarbamate, such as tetraethylthiuram disulfide.

Examples of the polymerization reaction also include living radical polymerization and active energy radiation polymerization.

The living radical polymerization typically includes atom transfer radical polymerization, reversible addition cleavage chain transfer, iodine transfer polymerization and iniferter polymerization, and can be carried out by using polymerization initiators disclosed in the following references A to C.

Reference A: K. Kamachi and T. Endo, "Radical Jugo Handbook" (Radical Polymerization Handbook), NTS, Inc., Japan, Aug. 10, 1999

Reference B: K. Matyjaszewski and T. P. Davis, "Handbook of Radical Polymerization", John Wiley and Sons, Canada, 2002

Reference C: JP-A-2005-105265

The active energy radiation polymerization may be carried out by using a compound disclosed in the following reference D as an active energy radiation polymerization initiator.

Reference D: The Technical Association of Photopolymers, Japan, "Kanko Zairyo List Book" (Photosensitive Material List Book), Bunshin Publication, Mar. 31, 1996

The active energy radiation referred in the present invention means an energy radiation that is capable of generating an active species through decomposition of a compound for generating an active species. Examples of the active energy radiation include a light energy ray, such as a visible ray, an ultraviolet ray, an infrared ray, an X-ray, an α-ray, a β-ray and a γ-ray, and an electron beam.

The active energy radiation polymerization initiator used is not particularly limited as long as it is a compound that generates a radical upon irradiation of an ultraviolet ray, a visible ray or the like. Examples of a compound used as the active energy radiation polymerization initiator include benzophenone, Michler's ketone, 4,4'-bis(diethylamino)benzophenone, xanthone, thioxanthone, isopropylxanthone, 2,4-diethylthioxanthone, 2-ethylanthraquinone, acetophenone, 2-hydroxy-2-methylpropyophenone, 2-hydroxy-2-methyl-4'-isopropylpropyophenone, 1-hydroxycyclohexyl phenyl ketone, isopropylbenzoin ether, isobutylbenzoin ether, 2,2-diethoxyacetophenone, 2,2-dimethoxy-2-phenylacetophenone, camphorquinone, benzanthrone, 2-methyl-1-(4-(methylthio)phenyl)-2-morpholinopropan-1-one, 2-benzyl-2-dimethylamino-1-(4-morpholinophenyl)butanone, ethyl 1,4-dimethylaminobenzoate, isoamyl 4-dimethylaminobenzoate, 4,4'-di(t-butylperoxycarbonyl)benzophenone, 3,4,4'-tri(t-butylperoxycarbonyl)benzophenone, 2,4,6-trimethylbenzoyldiphenylphosphine oxide, 2-(4'-methoxystyryl)-4,6-bis(trichloromethyl)-S-triazine, 2-(3',4'-dimethoxystyryl)-4,6-bis(trichloromethyl)S-triazine, 2-(2',4'-dimethoxystyryl)-4,6-bis(trichloromethyl)-S-triazine, 2-(2'-methoxystyryl)-4,6-bis(trichloromethyl)-S-triazine, 2-(4'-pentyoxystyryl)-4,6-bis(trichloromethyl)-S-triazine, 4-(p-N,N-di(ethoxycarbonylmethyl))-2,6-di(trichloromethyl)-S-triazine, 1,3-bis(trichloromethyl)-5-(2'-chlorophenyl)-S-triazine, 1,3-bis(trichloromethyl)-2-(p-dimethylaminostyryl)benzoxazole, 2-mercaptobenzothiazole, 2-(o-chlorophenyl)-4,4',5,5'-tetraphenyl-1,2'-biimidazole, 2,2'-bis(2-chlorophenyl)-4,4',5,5'-tetrakis(4-ethoxycarbonylphenyl)-1,2'-biimidazole, 2,2'-bis(2,4-dichlorophenyl)-4,4',5,5'-tetraphenyl-1,2'-biimidazole, 2,2'-bis(2,4-dibromophenyl)-4,4',5,5'-tetraphenyl 1,2'-biimidazole, 2,2'-bis(2,4,6-trichlorophenyl)-4,4',5,5'-tetraphenyl-1,2'-biimidazole, 3-(2-methyl-2-dimethylaminopropyonyl)carbazole, 3,6-bis(2-methyl-2-morpholinopropyonyl)-9-n-dodecylcarbazole, 1-hydroxycyclohexyl phenyl ketone and bis(η5-2,4-cyclopentadien-1-yl)-bis(2,6-difluoro3-(1H-pyrrol-1-yl)phenyl) titanium. These compounds may be used solely or as a mixture of two or more kinds thereof. Preferred examples of the compound include 3,3',4,4'-tetra(t-butylperoxycarbonyl)benzophenone, 3,3',4,4'-tetra(t-hexylperoxycarbonyl)benzophenone, 3,3'-di(methoxycarbonyl)-4,4'-di(t-butylperoxycarbonyl)benzophenone, 3,4'-di(methoxycarbonyl)-4,3'-di(t-butylperoxylcarbonyl)benzophenone and 4,4'-di(methoxycarbonyl)-3,3'-di(t-butylperoxycarbonyl)benzophenone.

The amount of the polymerization initiator used in the addition polymerization may be about from 0.01 to 10% by mol based on the total molar amount of the monomers.

In the addition polymerization, a chain transfer agent may be used. The molecular weight of the polymer can be appropriately controlled by using the chain transfer agent. Examples of the chain transfer agent include a mercaptan compound, such as thio-β-naphthol, thiophenol, butylmercaptan, ethyl thioglycolate, mercaptoethanol, mercaptoacetic acid, isopropylmercaptan, t-butylmercaptan, dodecanethiol, thiomalic acid, pentaerythritol tetra(3-mercaptopropionate) and pentaerythritol tetra(3-mercaptoacetate); and a disulfide compound, such as diphenyldisulfide, diethyl dithioglycolate and diethyldisulfide; and also include toluene, methyl isobutyrate, carbon tetrachloride, isopropylbenzene, diethyl ketone, chloroform, ethylbenzene, butyl chloride, s-butyl alcohol, methyl ethyl ketone, methyl isobutyl ketone, propylene chloride, methylchloroform, t-butylbenzene, butyl alcohol, isobutyl alcohol, acetic acid, ethyl acetate, acetone, dioxane, tetrachloroethane, chlorobenzene, methylcyclohexane, t-butyl alcohol and benzene. In particular, mercaptoacetic acid can lower the molecular weight of the polymer, thereby making the molecular weight distribution uniform.

The chain transfer agent may be used solely or as a mixture of two or more kinds thereof.

The production method of the polymer of the present invention may be an ordinary production method of an addition polymer, and examples of the production method used include a solution polymerization method, an emulsion polymerization method, a suspension polymerization method, a bulk polymerization method, a bulk-suspension polymerization method and a polymerization method using supercritical carbon dioxide.

In the case where a solution polymerization method is used, the fluorosilsesquioxane having one addition polymerizable functional group in a molecule (α), the organopolysiloxane having an addition polymerizable functional group (β), the addition polymerizable monomer containing a group having active hydrogen (ε), optionally the optional addition polymerizable monomer (δ), which may be added depending on necessity, the polymerization initiator, the chain transfer agent and the like are dissolved in an appropriate solvent, and the resulting solution is heated or irradiated with an active energy ray to perform addition polymerization.

Examples of the solvent used in the polymerization reaction include a hydrocarbon solvent (such as benzene and toluene), an ether solvent (such as diethyl ether, tetrahydrofuran, diphenyl ether, anisole and dimethoxybenzene), a halogenated hydrocarbon solvent (such as methylene chloride, chloroform and chlorobenzene), a ketone solvent (such as acetone, methyl ethyl ketone and methyl isobutyl ketone), an alcohol solvent (such as methanol, ethanol, propanol, isopropanol, butyl alcohol and t-butyl alcohol), a nitrile solvent (such as acetonitrile, propionitrile and benzonitrile), an ester solvent (such as ethyl acetate and butyl acetate), a carbonate solvent (such as ethylene carbonate and propylene carbonate), an amide solvent (such as N,N-dimethylformamide and N,N-dimethylacetamide), a hydrochlorofluorocarbon solvent (such as HCFC-141b and HCFC-225), a hydrofluorocarbon (HFCs) solvent (such as HFCs having a carbon number of 2 to 4, 5 and 6 or more), a perfluorocarbon solvent (such as perfluoropentane and perfluorohexane), an alicyclic hydrofluorocarbon solvent (such as fluorocyclopentane and fluorocyclobutane), an oxygen-containing fluorine solvent (such as fluoroether, fluoropolyether, fluoroketone and fluoroalcohol), an aromatic fluorine solvent (such as α,α,α-trifluorotoluene and hexafluorobenzene), and water. These solvents may be used solely or in combination of two or more kinds thereof.

The solvent may be used in such an amount that provides a monomer concentration of about 10 to 80% by weight.

The reaction temperature is not particularly limited and may be generally about 0 to 200° C., and preferably from room temperature to about 150° C. The polymerization reaction may be carried out under reduced pressure, ordinary pressure or increased pressure, depending on the kind of the monomer, the kind of the solvent and the like.

The polymerization reaction is preferably carried out under an inert gas atmosphere, such as nitrogen and argon. This is because radicals generated are prevented from undergoing deactivation through contact with oxygen, whereby the polymerization rate is prevented from being decreased to provide a polymer having a molecular weight appropriately controlled. The polymerization reaction is preferably carried out under reduced pressure in a polymerization system, from which dissolved oxygen has been removed. Dissolved oxygen is removed under reduced pressure, and subsequently the polymerization reaction may be carried out while maintaining reduced pressure.

The polymer obtained in the form of solution may be purified or isolated by an ordinary method, and the solution itself may be used for forming a film.

Upon purifying the polymer of the present invention, a purification method by reprecipitation is preferably employed. The purification method is generally performed in the following manner. A solvent that does not dissolve the polymer but dissolves the unreacted monomer, i.e., a so-called precipitation agent, is added to the solution containing the polymer and the unreacted monomer, thereby precipitating only the polymer. The amount of the precipitation agent used is preferably 20 to 50 times the weight of the polymerization reaction solution. The precipitation agent preferably is compatible with the solvent used upon polymerization, completely does not dissolve the polymer, but dissolves only the unreacted monomer, and has a relatively low boiling point. Preferred examples of the precipitation agent include a lower alcohol and an aliphatic hydrocarbon. Particularly preferred examples of the precipitation agent include methanol, ethanol, 2-propanol, hexane and heptane. These may be used solely or as a mixture of two or more kinds thereof. In the case where plural solvents are used as a mixture, Solmix AP-1, A-11 and the like, available as modified alcohol from Japan Alcohol Trading Co., Ltd., may be used. The reprecipitation operation may be performed repeatedly for enhancing the removal efficiency of the unreacted monomer. According to the operation, only the polymer can be deposited in the poor solvent, and can be easily isolated from the unreacted monomer by filtration.

Polymer of the Present Invention

As described above, the group having a polymerizable unsaturated bond can be introduced by reacting the precursor of the polymer of the present invention with a compound having a functional group that reacts with the functional group capable of introducing a group having a polymerizable unsaturated bond (i.e., a group having active hydrogen) of the constitutional unit (E) and a polymerizable unsaturated bond, in one molecule.

Examples of the compound having a functional group that reacts with a group having active hydrogen and a group having a polymerizable unsaturated bond in one molecule include an isocyanate compound having a polymerizable unsaturated bond, an acid halide compound having a polymerizable unsaturated bond, a carboxylic acid compound having a polymerizable unsaturated bond, a carboxylate ester compound having a polymerizable unsaturated bond, and an epoxy compound having a polymerizable unsaturated bond. The group having a polymerizable unsaturated bond is preferably a radical polymerizable group, and examples thereof include (meth)acryl, allyl and styryl.

Examples of the isocyanate compound having (meth)acryl include compounds represented by the following formulae (6) to (9):

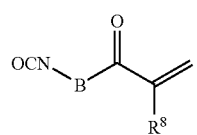
(6)

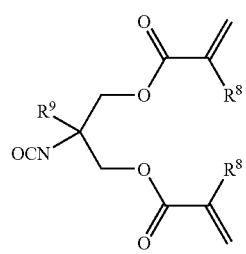
(7)

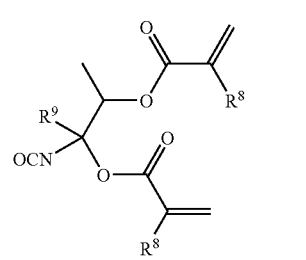
(8)

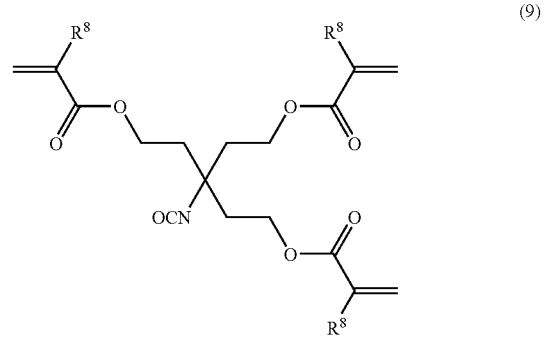
(9)

wherein $R^8$ and $R^9$ each represent hydrogen or methyl; B represents oxygen, alkylene having 1 to 3 carbon atoms, or —$OR^{10}$—; and $R^{10}$ represents alkylene having 2 to 12 carbon atoms, oxyalkylene having 2 to 12 carbon atoms, or arylene having 6 to 12 carbon atoms.

Examples of the isocyanate compound having styryl include compounds represented by the following formula (10):

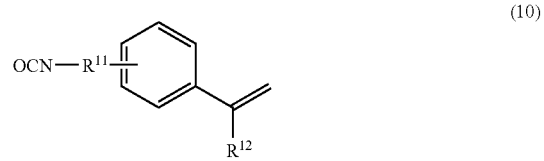
(10)

wherein $R^{11}$ represents alkylene having 1 to 10 carbon atoms; and $R^{12}$ represents hydrogen or methyl.

Preferred specific examples of the isocyanate compound having a polymerizable unsaturated bond include 2-isocyanatoethyl methacrylate, 2-isocyanatoethyl acrylate, 1,1-bis(acryloyloxymethyl)ethylisocyanate, 4-(2-isocyanatoisopropyl)styrene, and more preferably, 2-isocyanatoethyl methacrylate, 2-isocyanatoethyl acrylate and 1,1-bis(acryloyloxymethyl)ethylisocyanate.

Upon reacting the isocyanate compound having a polymerizable unsaturated bond with the group having active hydrogen, a urethanating catalyst may be used for accelerating the reaction.

Examples of the urethanating catalyst include an organic metal urethanating catalyst and a tertiary amine urethanating catalyst.

Examples of the organic metal urethanating catalyst include tin acetate, tin octylate, tin oleate, tin laurate, dibutyltin diacetate, dibutyltin dilaurate, dibutyltin dichloride, lead octanoate, lead naphthenoate, nickel naphthenoate and cobalt naphthenoate.

Examples of the tertiary amine urethanating catalyst include triethylenediamine, N,N,N',N',N'-pentamethyldipropylenetriamine, N,N,N',N',N'-pentamethyldiethylenetriamine, N,N,N',N'-tetramethylhexamethylenediamine, bis(dimethylaminoethyl)ether, 2-(N,N-dimethylamino)ethyl 3-(N,N-dimethylamino)propyl ether, N,N'-dimethylcyclohexylamine, N,N-dicyclohexylmethylamine, methylenebis(dimethylcyclohexyl)amine, triethylamine, N,N-dimethylacetylamine, N,N-dimethyldodecylamine, N,N-dimethylhexadecylamine, N,N,N',N'-tetramethyl-1,3-butanediamine, N,N-dimethylbenzylamine, morpholine, N-methylmorpholine, N-ethylmorpholine, N-(2-dimethylaminoethyl)morpholine, 4,4'-oxydiethylenedimorpholine, N,N'-dimethylpiperazine, N,N'-diethylpiperazine, N-methyl-N'-dimethylaminoethylpiperazine, 2,4,6-tri(dimethylaminomethyl)phenol, tetramethylguanidine, 3-dimethylamino-N,N-dimethylpropyonamide, N,N,N',N'-tetra(3-dimethylaminopropyl)methanediamine, N,N-dimethylaminoethanol, N,N,N',N'-tetramethyl-1,3-diamino-2-propanol, N,N,N'-trimethylaminoethylethanolamine, 1,4-bis(2-hydroxypropyl)-2-methylpiperazine, 1-(2-hydroxypropyl)imidazole, 3,3-diamino-N-methylpropylamine, 1,8-diazobicyclo(5,4,0)undecene-7, and N-methyl-N-hydroxyethylpiperazine.

These compounds may be used solely or in combination of two or more kinds thereof. The amount of the catalysts used may be arbitrary determined with respect to the isocyanate group, and is preferably 0.0001 to 1% by mol, and more preferably 0.001 to 1% by mol, based on the isocyanate group.

A solvent may be used depending on necessity upon providing the polymer of the present invention by using the isocyanate compound having a polymerizable unsaturated bond. The solvent used may be a solvent that is inert to the group having active hydrogen and the isocyanate group, and examples thereof include an aromatic hydrocarbon solvent, such as toluene and xylene, an ester solvent, such as ethyl acetate and butyl acetate, a ketone solvent, such as methyl ethyl ketone and cyclohexanone, a glycol ether ester solvent, such as ethylene glycol ethyl ether acetate, propylene glycol methyl ether acetate and ethyl 3-ethoxypropionate, an ether solvent, such as tetrahydrofuran and dioxane, and polar solvent, such as dimethylformamide, dimethylacetamide, N-methylpyrrolidone and furfural. These solvents may be used solely or in combination of two or more kinds thereof. The solvent may be used in such an amount that provides a concentration of the polymer containing a group having active hydrogen of about 10 to 80% by weight.

The reaction temperature is generally 0 to 120° C., and preferably 20 to 100° C. A reaction temperature lower than 0° C. may lower the reaction rate significantly, and a reaction temperature higher than 120° C. may cause polymerization.

The molar ratio of the isocyanate group/the group having active hydrogen upon reaction is generally 100/1 to 0.01/1, and preferably 20/1 to 0.1/1.

A polymerization inhibitor may be added for suppressing the polymerization upon reacting the isocyanate group and the group having active hydrogen. Examples of the polymerization inhibitor include p-benzoquinone, naphthoquinone, phenanthraquinone, p-xyloquinone, p-toluquinone, 2,6-dichloroquinone, 2,5-diphenyl-p-benzoquinone, 2,5-diacetoxy-p-benzoquinone, 2,5-dicaproxy-p-benzoquinone, 2,5-diacyloxy-p-benzoquinone, hydroquinone, p-t-butylcatechol, 2,5-t-butylhydroquinone, mono-t-butylhydroquinone and 2,5-di-t-amylhydroquinone. The amount of the polymerization inhibitor used is generally 10 to 10,000 ppm, and preferably from 50 to 1,000 ppm, based on the total amount of the precursor of the polymer of the present invention and the isocyanate compound having a polymerizable unsaturated bond.

Examples of the acid halide compound having a polymerizable unsaturated bond include a chloride compound, such as acryl chloride, methacryl chloride, styrenecarbonyl chloride, styrenesulfonyl chloride, 2-methacryloyloxyethylsuccinyl chloride and 2-methacryloyloxyethylhexahydrophthalyl chloride; and a bromide compound, such as acryl bromide, methacryl bromide, styrenecarbonyl bromide, styrenesulfonyl bromide, 2-methacryloyloxyethylsuccinyl bromide and 2-methacryloyloxyethylhexahydrophthalyl bromide. Halides of acrylic acid and methacrylic acid are preferred from the standpoint of ultraviolet ray-curing property.

Known esterification reaction may be employed for providing the polymer of the present invention having a polymerizable unsaturated bond on a side chain by using the acid halide compound having a polymerizable unsaturated bond. The esterification reaction herein is dehydrohalogenation reaction between the acid halide and the group having active hydrogen (preferably a hydroxyl group).

Hydrogen halide is by-produced through the reaction. It is generally preferred that a base as a hydrogen halide scavenger is added to the reaction system for removing the hydrogen halide from the reaction system. The base as a hydrogen halide scavenger is not particularly limited and known compounds may be used. Preferred examples of the base include a trialkylamine, such as trimethylamine, triethylamine and tripropylamine, pyridine, tetramethylurea, sodium hydroxide and sodium carbonate. The amount of the base used is preferably 1 mol or more per 1 mol of the carboxyl chloride.

An organic solvent is preferably used in the reaction. Preferred examples of the solvent include an aliphatic or aromatic hydrocarbon or halogenated hydrocarbon, such as benzene, toluene, xylene, hexane, heptane, petroleum ether, chloroform, methylene chloride and ethylene chloride; an ether compound, such as diethyl ether, dioxane and tetrahydrofuran; an N,N-dialkylformamide compound, such as N,N-dimethylformamide and N,N-diethylformamide; and dimethylsulfoxide.

The reaction temperature for the reaction may be selected from a wide range, and is generally selected from a range of from −20 to 100° C., and preferably 0 to 50° C. The reaction time is generally selected from a range of 5 minutes to 24 hours, and preferably 1 to 4 hours, while it varies depending on the species of the materials to be reacted. The reaction system is preferably stirred during the reaction.

After completing the reaction, the reaction product can be generally isolated by washing with water, drying and then distilling the solvent, but the reaction product may be subjected as it is to the subsequent esterification reaction without isolation operation.

Examples of the carboxylic acid compound having a polymerizable unsaturated bond include acrylic acid, methacrylic acid and vinylbenzoic acid.

Known esterification reaction may be employed for providing the polymer of the present invention having a polymerizable unsaturated bond on a side chain by using the carboxylic acid compound having a polymerizable unsaturated bond. The esterification reaction herein is dehydration condensation reaction between the carboxylic acid compound and the group having active hydrogen (preferably a hydroxyl group).

Examples of the carboxylate ester compound having a polymerizable unsaturated bond include methyl(meth)acrylate, ethyl(meth)acrylate, 1-propyl(meth)acrylate, 1-butyl (meth)acrylate, t-butyl(meth)acrylate and 2-ethylhexyl (meth)acrylate.

Known esterification reaction may be employed for providing the polymer of the present invention having a polymerizable unsaturated bond on a side chain by using the carboxylate ester compound having a polymerizable unsaturated bond. The esterification reaction herein is ester exchange reaction between the carboxylate ester compound and the group having active hydrogen (preferably a hydroxyl group).

Examples of the epoxy compound having a polymerizable unsaturated bond include glycidyl(meth)acrylate and 3,4-epoxycyclohexylmethyl(meth)acrylate.

Known epoxy ring-opening reaction between a cyclic ether and a hydroxyl group may be employed for providing the polymer of the present invention having a polymerizable unsaturated bond on a side chain by using the compound having a polymerizable unsaturated bond.

The polymer of the present invention having a polymerizable unsaturated bond on a side chain may also be obtained in the following manner. A part of the isocyanate groups of a compound having plural isocyanate groups, such as isophoronediisocyanate, is urethanated with a hydroxyl group-containing addition polymerizable monomer, such as 2-hydoxyethyl acrylate, to provide an isocyanate compound having a polymerizable unsaturated bond, and the isocyanate compound is urethanated with the group having active hydrogen (preferably a hydroxyl group).

<Purpose of the Polymer>

The polymer of the present invention may be applied to arbitrary purposes and can be used as a surface modifier (i.e., a so-called coating agent) after combining with another resin (which is hereinafter referred to as a binder resin) or another resin monomer (which is hereinafter referred to as a binder resin monomer) depending on necessity, or after dissolving or dispersing in an arbitrary solvent.

For exhibiting such functions as water repellency, oil repellency, releasing property, antifouling property or the like by forming a film on a surface of the base material, such as plastics, glass or metal, 1) the polymer of the present invention may be used solely, or 2) may be used after combining with a binder resin or a binder resin monomer. It is important that the film is firmly adhered to the base material for exhibiting the functions on the surface of the base material, and for fixing the polymer firmly to the base material, the binder resin is preferably used in combination. Furthermore, 3) a binder resin having a functional group capable of reacting with the polymer (which is hereinafter referred to as a reactive binder resin) and a component capable of crosslinking the polymer and the reactive binder resin may be used, whereby the polymer can be firmly fixed to the base material through the binder resin. For purposes that require such characteristics as heat resistance, light resistance, scratch resistance, abrasion resistance and the like, a binder resin having these characteristics may be used, thereby modifying the surface without deterioration of the characteristics inherent to the resin.

As described above, 1) the polymer of the present invention may be used solely as a surface modifier, 2) may be used as a surface modifier after mixing with another binder resin, or 3) may be used as a surface modifier after mixing with a binder resin monomer capable of reacting with the polymer of the present invention (which is hereinafter referred to as a reactive binder resin monomer).

By using the polymer of the present invention after mixing with another binder resin as in 2) above, the characteristics (such as mechanical property, surface or interface property and compatibility) inherent to the resin can be modified.

The binder resin may be any of a thermoplastic resin, a thermosetting resin and an active energy radiation-curable resin, and may contain plural kinds of resins.

Examples of the binder resin include polyethylene, polypropylene, polyvinyl chloride, polyvinylidene chloride, polystyrene, an acrylonitrile-styrene resin, an acrylonitrile-butadiene-styrene resin, a poly(meth)acrylate resin, super-high molecular weight polyethylene, poly-4-methylpentene, syndiotactic polyethylene, polyamide (such as nylon 6, nylon 6,6, nylon 6,10, nylon 6,T and nylon MXD6, trade names by DuPont), polyester (such as polyethylene terephthalate, polybutylene terephthalate and polyethylene 2,6-naphthalenedicarboxylate), polyacetal, polycarbonate, polyphenylene oxide, a fluorine resin (such as polytetrafluoroethylene and polyvinylidene fluoride), polyphenylene sulfide, polysulfone, polyether sulfone, polyether ether ketone, polyarylate (such as U Polymer, a trade name by Unitika Ltd., and Vectra, a trade name by Polyplastics Co., Ltd.), polyimide (such as Kapton, a trade name by Toray Industries, Inc., and AURUM, a trade name by Mitsui Chemicals, Inc.), polyetherimide, polyamideimide, a phenol resin, an alkyd resin, a melamine resin, an epoxy resin, a urea resin, a bismaleimide resin, a polyesterurethane resin, a polyetherurethane resin and a silicone resin.

These resins may be used solely or in combination of plural kinds thereof.

The polymer of the present invention may be used after mixing with a reactive binder resin monomer as in 3) above. In particular, when the polymer of the present invention having a polymerizable unsaturated bond on a side chain is used with a reactive binder resin monomer, the polymer of the present invention and a resin obtained by curing is crosslinked, thereby providing a composite resin excellent in mechanical property, surface or interface property and compatibility.

Specifically, a solution, which contains the polymer of the present invention having a polymerizable unsaturated bond on a side chain, the reactive binder resin monomer, and depending on necessity, a curing reaction initiator, is coated on a substrate, and then the coated film is dried and cured, thereby forming a film of a composite resin containing the binder resin (composite film) on the substrate.

The composite film thus formed has high water repellency and oil repellency and has low surface free energy.

Preferred examples of the reactive binder resin monomer include such a monomer that forms a UV-curable resin capable of being radically cured by irradiation of an ultraviolet ray.

<Monomer Forming UV-Curable Resin>

Examples of the resin that can be radically cured by irradiation of an ultraviolet ray include a resin having an unsaturated bond capable of being radically polymerized, such as a (meth)acrylate monomer, an unsaturated polyester resin, a polyester(meth)acrylate resin, an epoxy(meth)acrylate resin and a urethane(meth)acrylate resin.

Examples of the (meth)acrylate monomer include a compound obtained by reacting a polyhydric alcohol with an α,β-unsaturated carboxylic acid. Specific examples thereof include polyalkylene glycol di(meth)acrylate, ethylene glycol(meth)acrylate, propylene glycol(meth)acrylate, polyethylene polytrimethylolpropane di(meth)acrylate, trimethylolpropane tri(meth)acrylate, trimethylolpropane ethoxy tri(meth)acrylate, trimethylolpropane diethoxy tri(meth)acrylate, trimethylolpropane triethoxy tri(meth)acrylate, trimethylolpropane tetraethoxy tri(meth)acrylate, trimethylolpropane pentaethoxy tri(meth)acrylate, tetramethylolmethane tetra(meth)acrylate, tetramethylolpropane tetra (meth)acrylate, pentaerythritol tri(meth)acrylate, pentaerythritol tetra(meth)acrylate, pentaerythritol penta(meth)acrylate, dipentaerythritol penta(meth)acrylate and dipentaerythritol hexa(meth)acrylate. Examples thereof further include a compound having a silsesquioxane skeleton that has a (meth)acrylate group as a functional group.

Examples of the unsaturated polyester resin include a condensation product of esterification reaction between a polyhydric alcohol and an unsaturated polybasic acid (with a saturated polyhydric acid depending on necessity) (i.e., an unsaturated polyester), which has been dissolved in a polymerizable monomer.

The unsaturated polyester can be produced by polycondensation of an unsaturated acid, such as maleic anhydride, and a diol, such as ethylene glycol. Specifically, the unsaturated polyester can be produced in such a manner that a polyhydric acid having a polymerizable unsaturated bond, such as fumaric acid, maleic acid and itaconic acid, or an anhydride thereof as an acid component is reacted with a polyhydric alcohol as an alcohol component, such as ethylene glycol, propylene glycol, diethylene glycol, dipropylene glycol, 1,2-butanediol, 1,3-butanediol, 1,5-pentanediol, 1,6-hexanediol, 2-methyl-1,3-propanediol, 2,2-dimethyl-1,3-propanediol, cyclohexane-1,4-dimethanol and bisphenol A, to which a polybasic acid having no polymerizable unsaturated bond, such as phthalic acid, isophthalic acid, terephthalic acid, tetrahydrophthalic acid, adipic acid and sebacic acid, or an anhydride thereof may be added as an acid component depending on necessity.

Examples of the polyester(meth)acrylate resin include (1) a (meth)acrylate obtained by reacting an epoxy compound containing an α,β-unsaturated carboxylate ester group with a polyester having terminal carboxyl groups obtained from a saturated polybasic acid and/or an unsaturated polybasic acid and a polyhydric alcohol, (2) a (meth)acrylate obtained by reacting a hydroxyl group-containing acrylate with a polyester having terminal carboxyl groups obtained from a saturated polybasic acid and/or an unsaturated polybasic acid and a polyhydric alcohol, and (3) a (meth)acrylate obtained by reacting (meth)acrylic acid with a polyester having terminal hydroxyl groups obtained from a saturated polybasic acid and/or an unsaturated polybasic acid and a polyhydric alcohol.

Examples of the saturated polybasic acid used as a starting material of the polyester(meth)acrylate include a polybasic acid having no polymerizable unsaturated bond, such as phthalic acid, isophthalic acid, terephthalic acid, tetrahydrophthalic acid, adipic acid and sebacic acid, and anhydrides thereof, and a polymerizable unsaturated polybasic acid, such as fumaric acid, maleic acid and itaconic acid, and anhydrides thereof. Examples of the polyhydric alcohol component are the same as those for the unsaturated polyester.

Examples of the epoxy(meth)acrylate resin that can be used in the present invention include a compound having a polymerizable unsaturated bond formed through ring-opening reaction of a compound having a glycidyl group (epoxy group) and a carboxyl group of a carboxyl compound having a polymerizable unsaturated bond, such as acrylic acid, (i.e., a vinyl ester), which has been dissolved in a polymerizable monomer.

The vinyl ester may be produced by a known method, and examples thereof include epoxy(meth)acrylate obtained by reacting an unsaturated monobasic acid, such as acrylic acid and methacrylic acid, with an epoxy resin.

Various kinds of an epoxy resin may be reacted with bisphenol (such as bisphenol A) or a dibasic acid, such as adipic acid, sebacic acid and dimer acid (such as Haridimer 270C, available from Harima Chemicals, Inc.), thereby imparting flexibility thereto.

Examples of the epoxy resin as a starting material include bisphenol A glycidyl ether and a high molecular weight homolog thereof, and a novolac type glycidyl ether compound.

Examples of the urethane(meth)acrylate include a radical polymerizable unsaturated group-containing oligomer, which can be obtained, for example, in such a manner that a polyisocyanate is reacted with a polyhydroxy compound or a polyhydric alcohol, and then further reacted with a hydroxyl group-containing (meth)acryl compound and, depending on necessity, a hydroxyl group-containing allyl ether compound.

Examples of the polyisocyanate include 2,4-tolylenediisocyanate and an isomer thereof, diphenylmethanediisocyanate, hexamethylenediisocyanate, hydrogenated xylylenediisocyanate, isophoronediisocyanate, xylylenediisocyanate, dicyclohexylmethanediisocyanate, naphthalenediisocyanate, triphenylmethanetriisocyanate, Burnock D-750 and Crisvon NK (trade names, produced by Dainippon Ink And Chemicals, Inc.), Desmodur L (a trade name, produced by Sumika Bayer Urethane Co., Ltd.), Coronate L (a trade name, produced by Nippon Polyurethane Industry Co., Ltd.), Takenate D102 (a trade name, produced by Mitsui Takeda Chemicals, Inc.), and Isonate 143L (a trade name, produced by Mitsubishi Chemical Corporation).

Examples of the polyhydroxy compound include polyester polyol and polyether polyol, and specific examples thereof include a glycerin-ethylene oxide adduct, a glycerin-propylene oxide adduct, a glycerin-tetrahydrofuran adduct, a glycerin-ethylene oxide-propylene oxide adduct, a trimethylolpropane-ethylene oxide adduct, a trimethylolpropane-propylene oxide adduct, a trimethylolpropane-tetrahydrofuran adduct, a trimethylolpropane-ethylene oxide-propylene oxide adduct, a dipentaerythritol-ethylene oxide adduct, a dipentaerythritol-propylene oxide adduct, a dipentaerythritol-tetrahydrofuran adduct and a dipentaerythritol-ethylene oxide-propylene oxide adduct.

Examples of the polyhydric alcohol include ethylene glycol, diethylene glycol, triethylene glycol, polyethylene glycol, propylene glycol, dipropylene glycol, polypropylene glycol, 2-methyl-1,3-propanediol, 1,3-butanediol, a propylene oxide adduct or an ethylene oxide adduct of bisphenol A, 1,2,3,4-tetrahydroxybutane, glycerin, trimethylolpropane, 1,3-butanediol, 1,2-cyclohexane glycol, 1,3-cyclohexane glycol, 1,4-cyclohexane glycol, p-xylene glycol, bicyclohexyl-4,4-diol, 2,6-decalin glycol and 2,7-decalin glycol.

The hydroxyl group-containing (meth)acryl compound is not particularly limited and is preferably a hydroxyl group-containing (meth)acrylate ester, examples of which include 2-hydroxyethyl(meth)acrylate, 2-hydroxypropyl(meth)acrylate, 3-hydroxybutyl(meth)acrylate, polyethylene glycol mono(meth)acrylate, polypropylene glycol mono(meth)acrylate, tris(hydroxyethyl)isocyanuric acid di(meth)acrylate and pentaerythritol tri(meth)acrylate.

Examples of the acrylate monomer include a fluorine silicon compound disclosed in Japanese Patent No. 2,655,683, which is obtained in such a manner that a silanol having a fluorine-containing hydrocarbon group and hexamethylcyclotrisiloxane are polymerized, to which chlorosilane having a polymerizable unsaturated bond is reacted to terminate the polymerization. Examples of the fluorine silicon compound include compounds represented by the following formulae (I-1) and (I-2) (wherein n represents a number of 0 to 500, and $R^{13}$ represents hydrogen or methyl):

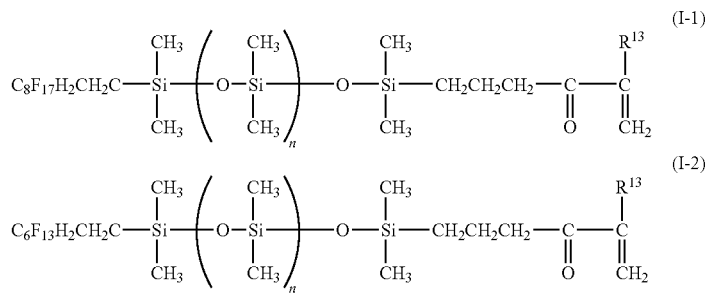

<Surface Modifier>

The surface modifier of the present invention contains the fluorine-containing resin composition of the present invention. The surface modifier of the present invention may further contain other components than the fluorine-containing resin composition of the present invention from the standpoint of controlling the concentration of the fluorine-containing resin composition and the properties of the surface modifier and curing the fluorine-containing resin composition upon forming a film in a later stage. Examples of the other components include a polymerization initiator and a solvent.

In the case where the polymer of the present invention is used after mixing with the reactive binder resin monomer, a polymerization initiator may be used for accelerating curing. The polymerization initiator may be such an initiator that generates radicals with heat or an active energy radiation, and an active energy radiation polymerization initiator generating radicals with an active energy radiation is preferably used.

Examples of the active energy radiation polymerization initiator include those described for the aforementioned active energy radiation polymerization initiator.

The polymer of the present invention and the binder resin monomer may be used after dissolving in a solvent. Examples of the solvent used include a hydrocarbon solvent (such as benzene and toluene), an ether solvent (such as diethyl ether, tetrahydrofuran, diphenyl ether, anisole and dimethoxybenzene), a halogenated hydrocarbon solvent (such as methylene chloride, chloroform and chlorobenzene), a ketone solvent (such as acetone, methyl ethyl ketone and methyl isobutyl ketone), an alcohol solvent (such as methanol, ethanol, propanol, isopropanol, butyl alcohol and t-butyl alcohol), a nitrile solvent (such as acetonitrile, propionitrile and benzonitrile), an ester solvent (such as ethyl acetate and butyl acetate), a carbonate solvent (such as ethylene carbonate and propylene carbonate), an amide solvent (such as N,N-dimethylformamide and N,N-dimethylacetamide), a hydrochlorofluorocarbon solvent (such as HCFC-141b and HCFC-225), a hydrofluorocarbon (HFCs) solvent (such as HFCs having a carbon number of 2 to 4, 5 and 6 or more), a perfluorocarbon solvent (such as perfluoropentane and perfluorohexane), an alicyclic hydrofluorocarbon solvent (such as fluorocyclopentane and fluorocyclobutane), an oxygen-containing fluorine solvent (such as fluoroether, fluoropolyether, fluoroketone and fluoroalcohol), an aromatic fluorine solvent (such as α,α,α-trifluorotoluene and hexafluorobenzene), and water. These solvents may be used solely or in combination of two or more kinds thereof.

The solvent may be used in such an amount that provides a total concentration of the polymer of the present invention and the binder resin monomer of about 1 to 50% by weight.

The surface modifier of the present invention may further contain an arbitrary component in such a range that does not impair the surface lubricating property, the water repellency and the oil repellency owing to the fluorine-containing resin composition. Examples of the arbitrary component include an active energy radiation sensitizer, a polymerization inhibitor, a polymerization initiator assistant, a leveling agent, a wettability improving agent, a surfactant, a plasticizer, an ultraviolet ray absorbent, an antioxidant, an antistatic agent, a silane coupling agent, an inorganic filler, such as silica and alumina, and an organic filler.

Examples of a curing assistant that can be contained in the surface modifier of the present invention, thereby enhancing the curing property of the fluorine-containing resin composition and the adhesion thereof onto the base material include a compound having two or more thiol groups in one molecule. Specific examples of the compound include hexanedithiol, decanedithiol, 1,4-dimethylmercaptobenzene, butanediol bisglycolate, ethylene glycol bisthioglycolate, trimethylolpropane tristhioglycolate, butanediol bisthiopropionate, trimethylolpropane tristhiopropionate, trimethylolpropane tristhioglycolate, pantaerythritol tetrakisthiopropionate, pentaerythritol tetrakisthioglyconate, trishydroxyethyl tristhiopripionate, 1,4-bis(3-mercaptobutylyloxy)butane (Karenz MT BD1, a trade name, produced by Showa Denko Co., Ltd.), pentaerythritol tetrakis(3-mercaptobutylate) (Karenz MT PE1, a trade name, produced by Showa Denko Co., Ltd.) and 1,3,5-tris(3-mercaptobutyloxyethyl)-1,3,5-triazin-2,4,6(1H,3H,5H)-trione (Karenz MT NR1, a trade name, produced by Showa Denko Co., Ltd.).

<Film and Molded Article>

The film of the present invention and a molded article having the film can be obtained with the surface modifier of the present invention. More specifically, the film of the present invention can be obtained through a step of forming an uncured film of the surface modifier of the present invention, and a step of curing the uncured film. The uncured film can be formed, for example, by coating, and the uncured film can be generally cured by one of or two or more of drying, heating and irradiation of an active energy radiation.

The method of coating a solution containing the polymer of the present invention on a substrate is not particularly limited, and examples of the method include a spin coating method, a roll coating method, a slit coating method, a dipping method, a spray coating method, a gravure coating method, a reverse coating method, a rod coating method, a bar coating method, a die coating method, a kiss coating method, a reverse kiss coating method, an air knife coating method and a curtain coating method.

Examples of the substrate, on which the solution is coated, include a transparent glass substrate, such as white sheet glass, blue sheet glass and silica-coated blue sheet glass; a synthetic resin sheet or film, such as polycarbonate, polyester, an acrylic resin, a vinyl chloride resin, an aromatic polyamide resin, polyamideimide, polyimide, triacetate and diacetate; a transparent resin substrate for optical purposes, such as a cycloolefin resin including a norbornene resin (e.g., Zeonor and Zeonex, trade names, available from Zeon Corporation, and Arton, a trade name, available from JSR Corporation), methyacrylstyrene, polysulfone, an alicyclic acrylic resin and polylarylate; a metallic substrate, such as an aluminum plate, a copper plate, a nickel plate and a stainless steel plate; a ceramic plate; a semiconductor plate having a photoelectric conversion device; and urethane rubber and styrene rubber.

The substrate may be subjected to a pretreatment, and examples of the pretreatment include a chemical treatment with a silane coupling agent or the like, a sandblasting treatment, a corona discharge treatment, an ultraviolet ray treatment, a plasma treatment, an ion plating treatment, a sputtering treatment, a gas phase reaction treatment and a vacuum deposition treatment.

The coated solution can be dried under an environment at from room temperature to about 200° C.

In the case where an active energy radiation polymerization initiator is used, the uncured film is dried, and then cured by radiating an optical active energy radiation or an electron beam from an active energy radiation source.

The active energy radiation source is not particularly limited, and examples thereof include a low pressure mercury lamp, a high pressure mercury lamp, a super-high pressure mercury lamp, a metal halide lamp, a carbon arc, a xenon arc, a gas laser, a solid laser and an electron beam radiation apparatus in accordance with the property of used active energy radiation polymerization initiator. Examples of the purpose of the film of the present invention include a film for release paper or film, a water repellent or oil repellent film, an antifouling film, a lubricating film, an antireflection film and an insulating film.

EXAMPLES

The present invention will be described in more detail with reference to production examples and examples below, but the present invention is not limited to the description. The data of weight average molecular weight in the examples were obtained by the GPC (gel permeation chromatography) method with poly (methyl methacrylate) as a standard substance.

Production Example 1

Synthesis of γ-methacryloxypropylhepta(trifluoropropyl)-T$_8$-silsesquioxane 100 g of trifluoropropyltrimethoxysilane, 500 mL of THF, 10.5 g of deionized water and 7.9 g of sodium hydroxide were charged in a 1-L four-neck flask equipped with a reflux condenser, a thermometer and a dropping funnel, and heated over an oil bath under stirring by a magnetic stirrer from room temperature to a temperature where THF was refluxed. The stirring operation was continued for 5 hours from the start of refluxing to complete the reaction. Thereafter, the flask was taken out from the oil bath, and allowed to stand at room temperature over night. The flask was again set on the oil bath, and the content of the flask was concentrated by heating under constant pressure until a solid matter was deposited.

The product thus deposited was collected by filtering with a pressure filtering device equipped with a membrane filter having a pore size of 0.5 μm. The resulting solid matter was once washed with THF and dried in a vacuum dryer at 80° C. for 3 hours to provide 74 g of a solid matter in the form of colorless powder.

65 g of the resulting solid matter, 491 g of dichloromethane and 8.1 g of triethylamine were charged in a 1-L four-neck flask equipped with a reflux condenser, a thermometer and a dropping funnel, and then cooled to 3° C. over an ice bath. 21.2 g of γ-methacryloxypropyltrichlorosilane was then added thereto, and the flask was taken out from the ice bath after confirming that heat generation was terminated, and then aged at room temperature over night. The content of the flask was washed three times with ion exchanged water, and the dichloromethane layer was dried over anhydrous magnesium sulfate, followed by removing magnesium sulfate by filtering. The resulting solution was concentrated with a rotary evaporator until a viscous solid was deposited, to which 260 g of methanol was added, and stirred until the solid became powder. The resulting powder filtered with a pressure filtering device equipped with filter paper of 5 μm and then dried in a vacuum dryer at 65° C. for 3 hours to provide 41.5 g of a colorless powder solid. The resulting solid was measured for GPC and $^1$H-NMR and was confirmed as a compound (a-1) having the following structure.

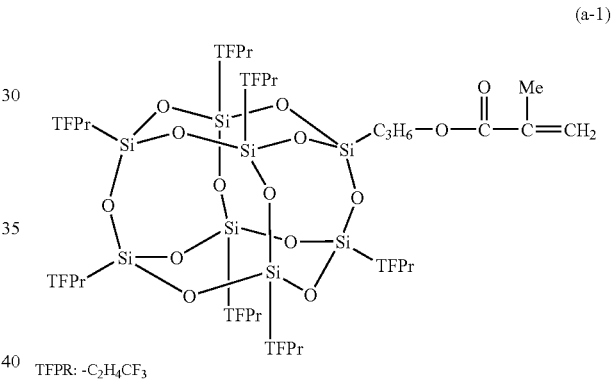

(a-1)

TFPR: -C$_2$H$_4$CF$_3$

Production Example 2

Synthesis of Polymer Having Hydroxyl Group (Precursor) (a1)

<Polymerization>

36.65 g of the compound (a-1), 3.37 g of methyl methacrylate (MMA), 0.97 g of 2-hydroxyethyl methacrylate (HEMA), 24.00 g of dimethylsilicone modified with methacryloxy group at one terminal (FM-0721, molecular weight: ca. 6,300) and 64.45 g of 2-butanone were charged in a 200-mL four-neck flask equipped with a reflux condenser, thermometer and a dropping funnel, which was then sealed with nitrogen. The content of the flask was refluxed over an oil bath maintained at 95° C. to perform deoxygenation for 10 minutes. A solution containing 0.35 g of 2,2'-azobisisobutyronitrile (AIBN) and 0.20 g of mercaptoacetic acid (AcSH) dissolved in 4.94 g of MEK was introduced into the flask to initiate polymerization while maintaining the refluxing temperature. After polymerizing for 3 hours, a solution containing 0.35 g of AIBN dissolved in 3.16 g of MEK was introduced, and the polymerization was continued for further 5 hours. After completing polymerization, 65 mL of modified alcohol (Solmix AP-1, produced by Japan Alcohol Trading Co., Ltd.) was added to the polymerization solution, and the polymerization solution was poured into 1,300 mL of Solmix AP-1 to deposit the polymer. After removing the supernatant, the polymer was dried under reduced pressure (at 40° C. for 3 hours and at 70° C. for 3 hours) to provide 40 g of a polymer having a hydroxyl group (a1). The resulting polymer (a1) had a weight average molecular weight of 31,200 and a molecular weight distribution of 1.43 as measured by GPC analysis. The polymer (a1) had compositional molar fractions of the monomer components of compound (a-1)/MMA/HEMA/FM-0721=41.7/42.8/10.1/5.4 and a hydroxyl group equivalent of 9,400 g/eq, as measured by $^1$H-NMR measurement.

Example 1

Synthesis of Polymer Having Methacryloyl Group on Side Chain (A1)

<Polymerization>

10.0 g of the polymer having a hydroxyl group (a1), 0.01 g of p-methoxyphenol (MEHQ), 0.0175 g of di-n-butyltin dilaurate (DBTDL) and 100 g of ethyl acetate were charged in a 200-mL four-neck flask equipped with a reflux condenser, a thermometer and a septum cap, which was then sealed with nitrogen. The flask was set on an oil bath maintained at 48° C. and heated. After the liquid temperature reached 45° C., 1.72 g of methacryloyloxyethylisocyanate (MOI, produced by Showa Denko Co., Ltd.) was introduced to initiate reaction. After reacting for 6 hours, the reaction solution was cooled to room temperature, to which 5.0 g of methanol (MeOH) was added to terminate the reaction. After completing the reaction, 50 mL of Solmix AP-1 was added to the reaction solution, and the reaction solution was poured into 1,000 mL of Solmix AP-1 to deposit the reaction product. After removing the supernatant, the reaction product was dried under reduced pressure (at 40° C. for 3 hours and at 70° C. for 3 hours) to provide 6.7 g of a polymer having a methacryloyl group (A1). The resulting polymer (A1) had a weight average molecular weight of 34,500 and a molecular weight distribution of 1.43 as measured by GPC analysis. The polymer (A1) had a methacryloyl group equivalent of 7,700 g/eq as measured by $^1$H-NMR measurement.

Example 2

Synthesis of Polymer Having Acryloyl Group on Side Chain (A2)

<Polymerization>

15.0 g of the polymer having a hydroxyl group (a1), 0.015 g of MEHQ, 0.0263 g of DBTDL and 130 g of ethyl acetate were charged in a 200-mL four-neck flask equipped with a reflux condenser, a thermometer and a septum cap, which was then sealed with nitrogen. The flask was set on an oil bath maintained at 48° C. and heated. After the liquid temperature reached 45° C., 2.35 g of acryloyloxyethylisocyanate (AOI, produced by Showa Denko Co., Ltd.) was introduced to initiate reaction. After reacting for 6 hours, the reaction solution was cooled to room temperature, to which 10.0 g of MeOH was added to terminate the reaction. After completing the reaction, 65 mL of Solmix AP-1 was added to the reaction solution, and the reaction solution was poured into 1,300 mL of Solmix AP-1 to deposit the reaction product. After removing the supernatant, the reaction product was dried under reduced pressure (at 40° C. for 3 hours and at 70° C. for 3 hours) to provide 11.8 g of a polymer having an acryloyl group (A2). The resulting polymer (A2) had a weight average molecular weight of 32,800 and a molecular weight distribution of 1.44 as measured by GPC analysis. The polymer (A2) had an acryloyl group equivalent of 6,900 g/eq as measured by $^1$H-NMR measurement.

Example 3

Synthesis of Polymer Having Acryloyl Group on Side Chain (A3)

<Polymerization>

An acryloyl group-containing isocyanate compound, which is obtained by urethanation reaction of isophoronediisocyanate and 2-hydroxyethyl acrylate in the presence of di-n-butyltin dilaurate (DBTDL) as a catalyst, is added to the polymer solution (a1), which is further reacted in the presence of DBTDL as a catalyst to provide a polymer having an acryloyl group on a side chain (A3).

Example 4

Preparation of Film 0.375 g of the polymer (A1) obtained in Example 1, 5.875 g of a polyfunctional urethane acrylate, U-15HA (produced by Snin-nakamura Chemical Co., Ltd.) and 1.25 g of Irgacure 184 (produced by Ciba Specialty Chemicals, Inc.) were dissolved in 30 g of tetrahydrofuran (THF) to provide a coating solution.

The resulting coating solution was spin-coated on a glass substrate at 3,000 rpm for 30 seconds, and then dried at 80° C. for 1 minute. The substrate was irradiated with an ultraviolet ray for 1 minute with a high pressure mercury lamp to provide a film. The film had a thickness of 2.5 μm.

Example 5

Preparation of Film

A film having a thickness of 2.5 μm was provided in the same manner as in Example 4 except that a coating solution prepared by using 0.375 g of the polymer (A2) obtained in Example 2 instead of the polymer (A1).

Comparative Example 1

A film having a thickness of 2.5 μm was provided in the same manner as in Example 4 except that a coating solution prepared by using 6.25 g of U-15HA, 1.25 g of Irgacure 184 and 30 g of THF.

Test Example 1

The films obtained in Examples 4 and 5 and Comparative Example 1 were measured for the properties in the following manner.

(1) Contact Angle

The film was measured for a contact angle (degree) by using FACE Contact Angle Meter (image analysis type) Model CA-X (produced by Kyowa Interface Science Co., Ltd.) with distilled water (for measuring nitrogen and phosphorus, produced by Kanto Chemical Co., Inc.) and methylene iodide (99%, produced by Sigma-Ardrich Japan Co., Ltd.) as probe liquids, and the surface free energy (mN/m)

was calculated according to Kaelble-Uy theory. The results obtained are shown in Table 1 below.

TABLE 1

|  |  | Example 4 | Example 5 | Comparative Example 1 |
|---|---|---|---|---|
| Formulation of coating composition | Polymer (A1) (g) | 0.375 | — | — |
|  | Polymer (A2) (g) | — | 0.375 | — |
|  | U-15HA (g) | 5.875 | 5.875 | 6.25 |
|  | Irgacure 184 (g) | 1.25 | 1.25 | 1.25 |
|  | THF (g) | 30 | 30 | 30 |
| Surface properties | Contact angle (°) (distilled water) | 104 | 103 | 75 |
|  | Contact angle (°) (methylene iodide) | 69 | 69 | 30 |
|  | Surface free energy (mN/m) | 24 | 24 | 45 |

Example 6

Synthesis of Polymer Having Acryloyl Group on Side Chain (A4)

<Synthesis of Polymer Having Hydroxyl Group on Side Chain>

40.00 g of the compound (a1), 13.80 g of MMA, 20.00 g of 2-hydroxyethyl methacrylate (HEMA), 26.20 g of FM-0721 and 99.16 g of MEK were charged in a 300-ml, four-neck flask equipped with a reflux condenser, a thermometer and a dropping funnel, which was then sealed with nitrogen. The content of the flask was refluxed over an oil bath maintained at 95° C. to perform deoxygenation for 10 minutes. A solution containing 0.54 g of AIBN and 0.30 g of AcSH dissolved in 7.57 g of MEK was introduced into the flask to initiate polymerization while maintaining the refluxing temperature. After polymerizing for 3 hours, a solution containing 0.54 g of AIBN dissolved in 4.85 g of MEK was introduced, and the polymerization was continued for further 5 hours to provide a polymerization solution (a2) containing a polymer having a hydroxyl group. The polymer had a weight average molecular weight of 30,800 and a molecular weight distribution of 1.58 as measured by GPC analysis of the polymerization solution. The polymer had compositional molar fractions of the monomer components of compound (a-1)/MMA/HEMA/FM-0721=7.4/44.0/47.9/0.7 as measured by $^1$H-NMR measurement.

<Synthesis of Polymer Having Acryloyl Group on Side Chain (A4)>

90.0 g of the polymerization solution containing polymer having a hydroxyl group (a2), 0.0514 g of MEHQ, 0.2564 g of DBTDL and 163.56 g of MEK were charged in a 500-mL four-neck flask equipped with a reflux condenser, a thermometer and a septum cap, which was then sealed with nitrogen. The flask was set on an oil bath maintained at 48° C. and heated. After the liquid temperature reached 45° C., 22.91 g of acryloyloxyethylisocyanate (AOI, produced by Showa Denko Co., Ltd.) was introduced to initiate reaction. After reacting for 6 hours, the reaction solution was cooled to room temperature, to which 42.26 g of MeOH was added to terminate the reaction. After completing the reaction, the reaction solution was concentrated with an evaporator to half the amount, and then poured into 1,030 mL of Solmix AP-1 to deposit the reaction product. After removing the supernatant, the reaction product was dried under reduced pressure (at 40° C. for 3 hours and at 70° C. for 3 hours) to provide 11.8 g of a polymer having an acryloyl group (A4). The resulting polymer (A4) had a weight average molecular weight of 39,400 and a molecular weight distribution of 1.58 as measured by GPC analysis.

Example 7

Preparation of Film 0.04 g of the polymer (A4) obtained in Example 6, 35.39 g of a polyfunctional urethane acrylate, Aronix M305 (produced by Toagosei Co., Ltd.), 3.71 g of a urethane prepolymer, P7-532 (produced by Kyoeisha Chemical Co., Ltd.), 1.97 g of 1,6-hexanediol diacrylate, A-HD-N (produced by Snin-nakamura Chemical Co., Ltd.), 1.06 g of Irgacure 907 (produced by Ciba Specialty Chemicals, Inc.), 0.27 g of Darocure EHA (produced by Ciba Specialty Chemicals, Inc.) and 0.27 g of Speedcure DETX (produced by Siber Hegner Japan, Co., Ltd.) were dissolved in 57.30 g of ethyl acetate to provide a coating solution. The coating solution had a solid concentration of 42% by weight. In the coating composition, the resin solid content had a fluorine concentration of 0.01% by weight and a silicone concentration of 0.02% by weight. The terms "fluorine concentration in resin solid content" and "silicone concentration in resin solid content" herein mean weight ratios of fluorine and silicone, respectively, contained in the polymer (A4) based on the total weight of solid contents including the polymer (A4) and the binder resin, and calculated from the weight ratio of the polymer (A4) and the binder resin.

The resulting coating solution was coated on a polyethylene terephthalate film (thickness: 100 μm, Lumirror 100-U34, a trade name, produced by Toray Industries, Inc.) by using a coating rod (#9, produced by R.D. Specialties, Inc.). The wet thickness obtained upon using the coating rod (#9) is 20 μm according to the brochure of R.D. Specialties, Inc.

The resulting coated film was dried in a high-temperature chamber at 80° C. for 3 minutes and irradiated with an ultraviolet ray at an illuminance of 80 mW/cm$^2$ and an exposure amount of 500 mJ/cm$^2$ by using a conveyor UV irradiation apparatus equipped with a high-pressure mercury lamp (H08-L41, produced by Iwasaki Electric Co., Ltd., rated power: 160 W/cm) to provide a transparent film having a theoretical thickness of 8 μm. The exposure amount was measured with an illuminance meter (UVPF-A1/PD-365, produced by Iwasaki Electric Co., Ltd.). The theoretical thickness was calculated according to the following expression based on the wet thickness upon using the coating rod (#9) and the resin solid content in the coating composition.

theoretical thickness (μm)=((wet thickness using coating rod)×(solid content (% by weight) in coating composition))/100

Comparative Example 2

Synthesis of Polymer Having Acryloyl Group on Side Chain (B1)

<Synthesis of Polymerization Solution Containing Polymer Having Hydroxyl Group on Side Chain (b1)>

11.40 g of 2,2,2-trifluoroethyl methacrylate represented by the following formula (b-1) (M1110, a trade name, produced by Daikin Industries, Ltd.), 1.44 g of MMA, 9.30 g of 2-hydroxyethyl methacrylate (HEMA), 7.86 g of FM-0721 and 29.74 g of MEK were charged in a 100-mL four-neck flask equipped with a reflux condenser, a thermometer and a dropping funnel, which was then sealed with nitrogen. The content of the flask was refluxed over an oil bath maintained at 95° C. to perform deoxygenation for 10 minutes. A solution containing 0.17 g of AIBN and 0.10 g of AcSH dissolved in 2.38 g of MEK was introduced into the flask to initiate polymerization while maintaining the refluxing temperature. After polymerizing for 3 hours, a solution containing 0.17 g of AIBN dissolved in 1.53 g of MEK was introduced, and the polymerization was continued for further 5 hours to provide a polymerization solution (b1) containing a polymer having a hydroxyl group. The polymer had a weight average molecular weight of 34,000 and a molecular weight distribution of 1.63 as measured by GPC analysis of the polymerization solution. The polymer had compositional molar fractions of the monomer components of compound (b-1)/MMA/HEMA/FM-0721=42.3/11.0/46.0/0.6 as measured by $^1$H-NMR measurement.

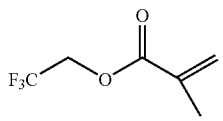

(b-1)

<Synthesis of Polymer Having Acryloyl Group on Side Chain (B1)>

A polymer was obtained in the same manner as in Example 6 except that the polymerization solution (b1) obtained above was used instead of the polymerization solution (a2). The resulting polymer (B1) had a weight average molecular weight of 37,900 and a molecular weight distribution of 1.76 as measured by GPC analysis.

Comparative Example 3

Synthesis of Polymer Having Acryloyl Group on Side Chain (B2)

<Synthesis of Polymerization Solution Containing Polymer Having Hydroxyl Group on Side Chain (b2)>

A polymerization solution (b2) containing a polymer having a hydroxyl group was obtained in the same manner as in Comparative Example 2 except that 2-(perfluorobutyl)ethyl methacrylate represented by the following formula (b-2) (M1420, a trade name, produced by Daikin Industries, Ltd.) was used instead of 2,2,2-trifluoroethyl methacrylate. The polymer had a weight average molecular weight of 28,800 and a molecular weight distribution of 1.62 as measured by GPC analysis of the polymerization solution. The polymer had compositional molar fractions of the monomer components of compound (b-2)/MMA/HEMA/FM-0721=11.6/39.9/48.2/0.4 as measured by $^1$H-NMR measurement.

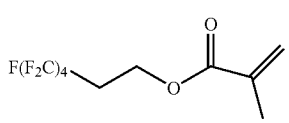

(b-2)

<Synthesis of Polymer Having Acryloyl Group on Side Chain (B2)>

A polymer was obtained in the same manner as in Example 6 except that the polymerization solution (b2) obtained above was used instead of the polymerization solution (a2). The resulting polymer (B2) had a weight average molecular weight of 41,200 and a molecular weight distribution of 1.50 as measured by GPC analysis.

Comparative Example 4

Synthesis of Polymer Having Acryloyl Group on Side Chain (B3)

<Synthesis of Polymerization Solution Containing Polymer Having Hydroxyl Group on Side Chain (b3)>

A polymerization solution (b3) containing a polymer having a hydroxyl group was obtained in the same manner as in Comparative Example 2 except that 2-(perfluorohexyl)ethyl methacrylate represented by the following formula (b-3) (M1620, a trade name, produced by Daikin Industries, Ltd.) was used instead of 2,2,2-trifluoroethyl methacrylate. The polymer had a weight average molecular weight of 27,200 and a molecular weight distribution of 1.66 as measured by GPC analysis of the polymerization solution. The polymer had compositional molar fractions of the monomer components of compound (b-3)/MMA/HEMA/FM-0721=7.5/45.2/46.9/0.4 as measured by $^1$H-NMR measurement.

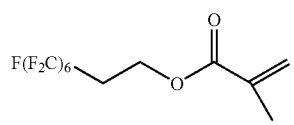

(b-3)

<Synthesis of Polymer Having Acryloyl Group on Side Chain (B3)>

A polymer was obtained in the same manner as in Example 6 except that the polymerization solution (b3) obtained above was used instead of the polymerization solution (a2). The resulting polymer (B2) had a weight average molecular weight of 38,700 and a molecular weight distribution of 1.55 as measured by GPC analysis.

Comparative Example 5

Preparation of Film

A coating solution was prepared, and a film was obtained thereby, in the same manner as in Example 7 except that the polymer (B1) obtained in Comparative Example 2 was used instead of the polymer (A4). In the coating solution, the resin solid content had a fluorine concentration of 0.01% by weight and a silicone concentration of 0.02% by weight.

Comparative Example 6

Preparation of Film

A coating solution was prepared, and a film was obtained thereby, in the same manner as in Example 7 except that the polymer (B2) obtained in Comparative Example 3 was used instead of the polymer (A4). In the coating solution, the resin solid content had a fluorine concentration of 0.01% by weight and a silicone concentration of 0.01% by weight.

Comparative Example 7

Preparation of Film

A coating solution was prepared, and a film was obtained thereby, in the same manner as in Example 7 except that the polymer (B3) obtained in Comparative Example 4 was used instead of the polymer (A4). In the coating solution, the resin solid content had a fluorine concentration of 0.01% by weight and a silicone concentration of 0.01% by weight.

Test Example 2

The films obtained in Example 7 and Comparative Examples 5 to 7 were measured for the properties in the following manner.

(1) Peel Strength

An acrylic adhesive tape (No. 31B, available from Nitto Denko Corporation) and a silicone adhesive tape (No. 8911, available from Sumitomo 3M, Ltd.) were each adhered to a film as a releasing layer, and press-adhered with a pressing roller of 2 kg. The peel strength between the releasing layer and the adhesive layer after lapsing 24 hours from press adhesion was measured with a tensile tester.

(2) Peel Strength (Heat Resistant)

An acrylic adhesive tape (No. 31B, available from Nitto Denko Corporation) and a silicone adhesive tape (No. 8911, available from Sumitomo 3M, Ltd.) were each adhered to a film as a releasing layer, and press-adhered with a pressing roller of 2 kg, and then the assembly was allowed to stand at room temperature for 30 minutes. The assembly was subjected to a thermal history of 1 hour in a high-temperature chamber at 130° C. and then allowed to cool for 30 minutes. The peel strength between the releasing layer and the adhesive layer was measured with a tensile tester.

(3) Contact Angle and Surface Free Energy

The film was measured for a contact angle with distilled water (for measuring nitrogen and phosphorus, produced by Kanto Chemical Co., Inc.) and methylene iodide (99%, produced by Sigma-Ardrich Japan Co., Ltd.) as probe liquids, and the surface free energy was calculated according to Kaelble-Uy theory.

(4) Friction Resistance (ASTM Flat Indenter)

The friction resistance was measured with a surface property tester, HEIDON Type 14W (Shinto Scientific Co., Ltd.), according to ASTM D1894.

(5) Surface Hardness

The surface hardness was measured with a surface property tester, HEIDON Type 14W (Shinto Scientific Co., Ltd.), according to JIS K5400.

(6) Adhesiveness

The film was cut in 11 lines with a 1-mm interval each in the horizontal and vertical directions to provide 100 squares. A commercially available cellophane adhesive tape (Cellotape, registered trademark, CT24, a trade name, produced by Nichiban Co., Ltd.) was well adhered on the squares, and then quickly peeled off forwardly at a peeling angle of 90°. The number of squares that were not peeled off but remained was counted. This method was performed according to the cross-cut test of JIS K5400.

(7) Antifouling Property

Lines each having a dimension of 1.5 mm×100 mm were drawn on the film with an oil-based felt pen (Magic Ink, registered trademark, M500-T1 (black), a trade name, available from Teranishi Chemical Industry Co., Ltd.) and an oil-based felt pen (Magic Ink, registered trademark, M500-T2 (red), a trade name, produced by Teranishi Chemical Industry Co., Ltd.), and the repellency of the oil-based ink was observed. The drawn lines of the oil-based ink were allowed to stand at room temperature for 24 hours, and then wiped out with a paper wiper (Kim Wipes, registered trademark, S-200, a trade name, produced by Jujo Kimberly). The easiness of the wiping operation and the state of the film after wiping were evaluated according to the following standard.

+++: The ink was easily wiped out.
++: The ink was wiped out, but marks remained.
+: The ink was completely not wiped out.

TABLE 2

| | | Example 7 | Comparative Example 5 | Comparative Example 6 | Comparative Example 7 |
|---|---|---|---|---|---|
| Polymer | | A4 | B1 | B2 | B3 |
| Base material | | polyethylene terephthalate film (thickness: 100 μm) | | | |
| Thickness of film (μm) | | 8 | 8 | 8 | 8 |
| Fluorine content of film (% by weight) | | 0.01 | 0.01 | 0.01 | 0.01 |
| Silicone content in film (% by weight) | | 0.02 | 0.02 | 0.01 | 0.01 |
| Surface properties | Contact angle (distilled water) (°) | 98 | 96 | 96 | 96 |
| | Contact angle (methylene iodide) (°) | 58 | 50 | 51 | 53 |
| | Surface free energy (mN/m) | 30 | 34 | 34 | 32 |
| Releasing property | Acrylic adhesive tape | After 24 hours (N/cm) | 0.8 | 2.7 | 2.6 | 2.0 |
| | | 130° C. × 1 hour (N/cm) | 2.7 | 4.6 | 4.7 | 4.3 |
| | Silicone adhesive tape | After 24 hours (N/cm) | 2.4 | 2.6 | 2.7 | 2.6 |
| | | 130° C. × 1 hour (N/cm) | 3.1 | 3.2 | 3.3 | 3.3 |
| Lubricating property | Static friction coefficient (μs) (ASTM D1894) | 0.45 | 0.56 | 0.56 | 0.57 |
| | Dynamic friction coefficient (μk) (ASTM D1894) | 0.41 | 0.46 | 0.46 | 0.48 |

TABLE 2-continued

|  |  | Example 7 | Comparative Example 5 | Comparative Example 6 | Comparative Example 7 |
|---|---|---|---|---|---|
| antifouling property | Oil-based ink repellency | repelled in dot form | repelled in line form | repelled in line form | repelled in line form |
|  | Oil-based ink wiping property | +++ | ++ | ++ | ++ |
| Adhesiveness | Cross-cut test (JIS K5400) | 100/100 | 100/100 | 100/100 | 100/100 |
| Surface hardness | Pencil hardness (JIS K5400) | 3H | 3H | 3H | 3H |

Evaluation Results of Test Examples and Discussions

It is understood from the comparison among Examples 4 and 5 and Comparative Example 1 in Table 1 that Examples 4 and 5 are clearly high in water repellency and oil repellency. It is considered that this is because of the effect of the fluorosilsesquioxane compound.

It is understood from the comparison among Example 7 and Comparative Examples 5 to 7 in Table 2 that Example 7 using the fluorosilsesquioxane compound has high water repellency and oil repellency for surface properties, a low peel strength for releasing properties, and a low static friction coefficient and a low dynamic friction coefficient for lubricating properties, and exhibits good results in repellency and wiping property of oil-based ink for antifouling property, as compared to Comparative Examples 5 to 7 using the other fluorine compound. The results suggest that the excellent blooming property of the fluorosilsesquioxane compound not only attains the function of the fluorosilsesquioxane compound, but also effectively elicits the excellent characteristics of the organopolysiloxane present in the same molecule.

INDUSTRIAL APPLICABILITY

The polymer and the surface modifier of the present invention can be applied to such purposes as prevention of sticking of a toner; enhancement of charging property of a toner; provision of anti-sticking property to a fixing roller, a magnetic roller, a rubber roller or the like; a surface modifier for a constitutional member of an electrophotographic duplicator, such as provision of sliding function to a releasing nail; a surface modifier for top coating and hard coating of automobiles for antifouling; an antifouling agent and an antifogging agent for a resin for optical use, such as a lens or the like; an antifouling agent for a building material, such as a wall material and a floor material; a releasing agent for a casting mold used for nanoimprinting; a modifier for a resist; a water repelling and water proofing agent for a printed circuit board; an antifouling agent for a protective film used for a display device; a surface modifier for preventing fouling of touch panel and attachment of fingerprints; a releasing agent for imparting releasing function to a film, such as a polyester film; and the like, thereby enhancing diversity of the properties and purposes.

What is claimed is:

1. A polymer comprising:
a constitutional unit A that is derived from fluorosilsesquioxane having one additional polymerizable functional group in a molecule;
a constitutional unit B that is derived from organopolysiloxane having an additional polymerizable functional group; and
a constitutional unit C that is derived from an additional polymerizable monomer and has a group having a polymerizable unsaturated bond on a side chain, and
optionally comprising a constitutional unit D that is derived from an additional polymerizable monomer other than the fluorosilsesquioxane having one additional polymerizable functional group in a molecule, the organopolysiloxane having an additional polymerizable functional group and the additional polymerizable monomer having a functional group capable of introducing a group having a polymerizable unsaturated bond.

2. The polymer according to claim 1, wherein the fluorosilsesquioxane having one additional polymerizable functional group in a molecule is represented by the following formula (1):

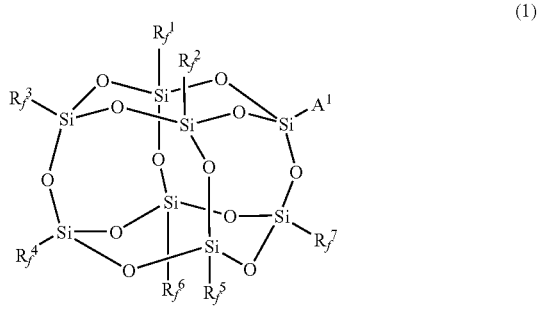

(1)

wherein $R_f^1$ to $R_f^7$ each independently represent fluoroalkyl having 1 to 20 carbon atoms, in which arbitrary methylene may be replaced by oxygen, fluoroaryl having 6 to 20 carbon atoms, in which at least one hydrogen is replaced by fluorine or trifluoromethyl, or fluoroarylalkyl having 7 to 20 carbon atoms, in which at least one hydrogen in aryl is replaced by fluorine or trifluoromethyl; and $A^1$ represents an addition polymerizable functional group.

3. The polymer according to claim 2, wherein in the formula (1), $R_f^1$ to $R_f^7$ each independently represent 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrododecyl, pentacosafluoro-1,1,2,2-tetrahydrotetradecyl, (3-heptafluoroisopropoxy)propyl, pentafluorophenylpropyl, pentafluorophenyl, or α,α,α-trifluoromethylphenyl.

4. The polymer according to claim 2, wherein in the formula (1), $R_f^1$ to $R_f^7$ each independently represent 3,3,3-trifluoropropyl, 3,3,4,4,5,5,6,6,6-nonafluorohexyl, or tridecafluoro-1,1,2,2-tetrahydrooctyl.

5. The polymer according to claim 1, wherein the organopolysiloxane having an additional polymerizable functional group is represented by the following formula (2):

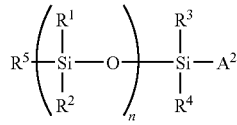
(2)

wherein n represents an integer of 1 to 1,000; $R^1$, $R^2$, $R^3$, $R^4$ and $R^5$ each independently represent hydrogen, alkyl having 1 to 30 carbon atoms, in which arbitrary hydrogen may be replaced by fluorine, and arbitrary —$CH_2$— may be replaced by —O— or cycloalkylene, substituted or unsubstituted aryl, or arylalkyl containing substituted or unsubstituted aryl and alkylene, in which arbitrary hydrogen may be replaced by fluorine, and arbitrary —$CH_2$— may be replaced by —O— or cycloalkylene; and $A^2$ represents an addition polymerizable functional group.

6. The polymer according to claim 5, wherein in the formula (2), $R^1$ and $R^2$ each independently represent hydrogen or alkyl having 1 to 8 carbon atoms, in which arbitrary hydrogen may be replaced by fluorine; $R^3$ and $R^4$ each independently represent alkyl having 1 to 20 carbon atoms, in which arbitrary hydrogen may be replaced by fluorine, aryl having 6 to 20 carbon atoms, in which arbitrary hydrogen may be replaced by fluorine, or arylalkyl having 7 to 20 carbon atoms, in which arbitrary hydrogen may be replaced by fluorine; and $R^5$ represents alkyl having 1 to 20 carbon atoms, in which arbitrary hydrogen may be replaced by fluorine, aryl having 6 to 20 carbon atoms, in which arbitrary hydrogen may be replaced by fluorine, or arylalkyl having 7 to 20 carbon atoms, in which arbitrary hydrogen may be replaced by fluorine.

7. The polymer according to claim 5, wherein in the formula (2), $R^1$ and $R^2$ each independently represent methyl, phenyl, or 3,3,3-trifluoropropyl; $R^3$ and $R^4$ each independently represent methyl or phenyl; and $R^5$ represents methyl, ethyl, propyl, butyl, isobutyl, phenyl, 3,3,3-trifluoropropyl, 3,3,4,4,4-pentafluorobutyl, 3,3,4,4,5,5,6,6,6-nonafluorohexyl, tridecafluoro-1,1,2,2-tetrahydrooctyl, heptadecafluoro-1,1,2,2-tetrahydrodecyl, henicosafluoro-1,1,2,2-tetrahydrodecyl, pentacosafluoro-1,1,2,2-tetrahydrotetradecyl, (3-heptafluoroisopropoxy)propyl, pentafluorophenylpropyl, pentafluorophenyl, or α,α,α-trifluoromethylphenyl.

8. The polymer according to claim 5, wherein in the formula (2), $R^1$, $R^2$, $R^3$ and $R^4$ each are methyl simultaneously.

9. The polymer according to claim 5, wherein $A^1$ in the formula (1) and the $A^2$ in the formula (2) are each a radical polymerizable functional group.

10. The polymer according to claim 9, wherein $A^1$ in the formula (1) and the $A^2$ in the formula (2) each contain (meth)acryl or styryl.

11. The polymer according to claim 10, wherein $A^1$ in the formula (1) is represented by the following formula (3) or (5), and the $A^2$ in the formula (2) is represented by the following formula (3), (4), or (5):

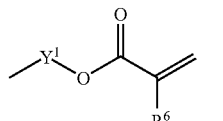
(3)

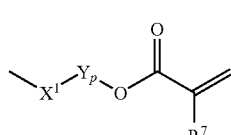
(4)

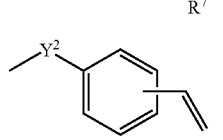
(5)

wherein
in the formula (3), $Y^1$ represents alkylene having 2 to 10 carbon atoms; and $R^6$ represents hydrogen, alkyl having 1 to 5 carbon atoms, or aryl having 6 to 10 carbon atoms,
in the formula (4), $R^7$ represents hydrogen, alkyl having 1 to 5 carbon atoms, or aryl having 6 to 10 carbon atoms; $X^1$ represents alkylene having 2 to 20 carbon atoms; Y represents —$OCH_2CH_2$—, —$OCHCH_3CH_2$—, or —$OCH_2CH(CH_3)$—; and p represents an integer of 0 to 3, and
in the formula (5), $Y^2$ represents a single bond or alkylene having 1 to 10 carbon atoms.

12. The polymer according to claim 11, wherein
in the formula (3), $Y^1$ represents alkylene having 2 to 6 carbon atoms; and $R^6$ represents hydrogen or methyl,
in the formula (4), $X^1$ represents —$CH_2CH_2CH_2$—; Y represents —$OCH_2CH_2$—; p represents 0 or 1; and $R^7$ represents hydrogen or methyl, and
in the formula (5), $Y^2$ represents a single bond or alkylene having 1 or 2 carbon atoms.

13. The polymer according to claim 1, wherein the group having a polymerizable unsaturated bond in the constitutional unit C is a radical polymerizable functional group.

14. The polymer according to claim 1, wherein the group having a polymerizable unsaturated bond in the constitutional unit C is (meth)acryl or styryl.

15. A resin composition comprising the polymer according to claim 1, and at least one resin selected from a thermoplastic resin, a thermosetting resin and an active radiation-curable resin.

16. A surface modifier comprising the polymer according to claim 1.

17. A film comprising the surface modifier according to claim 16.

18. A surface modifier comprising the resin composition according to claim 15.

19. A film comprising the surface modifier according to claim 18.

* * * * *

UNITED STATES PATENT AND TRADEMARK OFFICE
CERTIFICATE OF CORRECTION

| | | |
|---|---|---|
| PATENT NO. | : 7,868,112 B2 | Page 1 of 1 |
| APPLICATION NO. | : 12/519347 | |
| DATED | : January 11, 2011 | |
| INVENTOR(S) | : Oikawa et al. | |

It is certified that error appears in the above-identified patent and that said Letters Patent is hereby corrected as shown below:

Column 17, Lines 19-20, "1,3-bis(trichloromethyl)-2-(p-dimethylaminostyryl)benzoxazole," should be changed to --1,3-bis(trichloromethyl)-5-(4'-methoxyphenyl)-S-triazine, 2-(p-dimethylaminostyryl)benzoxazole 2-(p-dimethylaminostyryl)benzothiazole,--

Column 17, Line 21, "2-mercaptobenzothiazole," should be changed to --2-mercaptobenzothiazole, 3,3'-carbonylbis(7-diethylaminocoumarin),--

Column 17, Line 26, "tetraphenyl 1,2'-biimidazole," should be changed to --tetraphenyl-1,2'-biimidazole,--

Column 17, Line 31, "difluoro3" should be changed to --difluoro-3--

Column 17, Line 38, "butylperoxylcarbonyl)" should be changed to --butylperoxycarbonyl)--

Column 30, Line 41, "TFPR: -C$_2$H$_4$CF$_3$" should be changed to --TFPr: -C$_2$H$_4$CF$_3$--

Column 33, Line 29, "in a 300 ml," should be changed to --in a 300 mL,--

Signed and Sealed this
Twenty-third Day of August, 2011

David J. Kappos
*Director of the United States Patent and Trademark Office*